(12) United States Patent
Ikeda

(10) Patent No.: US 12,219,075 B2
(45) Date of Patent: Feb. 4, 2025

(54) DETECTION DEVICE

(71) Applicant: Japan Display Inc., Tokyo (JP)

(72) Inventor: Masataka Ikeda, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 161 days.

(21) Appl. No.: 18/115,796

(22) Filed: Mar. 1, 2023

(65) Prior Publication Data

US 2023/0208658 A1 Jun. 29, 2023

Related U.S. Application Data

(63) Continuation of application No. PCT/JP2021/030162, filed on Aug. 18, 2021.

(30) Foreign Application Priority Data

Sep. 9, 2020 (JP) .................................. 2020-151570

(51) Int. Cl.
*H04N 5/357* (2011.01)
*H04L 9/32* (2006.01)

(52) U.S. Cl.
CPC .............................. *H04L 9/3278* (2013.01)

(58) Field of Classification Search
CPC ..................................................... H04L 9/3278
See application file for complete search history.

(56) References Cited

U.S. PATENT DOCUMENTS

| 8,045,028 | B1* | 10/2011 | De Wit ............... | H04N 23/667 |
| | | | | 257/290 |
| 10,356,353 | B2* | 7/2019 | Okura ............... | H01L 27/14643 |
| 2018/0115723 | A1* | 4/2018 | Takayanagi ............ | H04N 25/75 |
| 2018/0227524 | A1* | 8/2018 | Machida ............... | H04N 25/131 |

FOREIGN PATENT DOCUMENTS

| JP | 2019-180003 A | 10/2019 |
| WO | 2016/167076 A1 | 10/2016 |

OTHER PUBLICATIONS

International Search Report and Written Opinion mailed on Oct. 12, 2021, received for PCT Application PCT/JP2021/030162, filed on Aug. 18, 2021, 8 pages including English Translation.

* cited by examiner

*Primary Examiner* — Kurtis R Bahr
(74) *Attorney, Agent, or Firm* — XSENSUS LLP

(57) ABSTRACT

A detection device includes a pixel including a photodiode connected to a gate electrode of a first transistor, and a control circuit configured to control an operation of the pixel in a reset period (including a first and a second periods) for resetting the gate electrode, an exposure period for exposing the photo diode, and a read-out period (a fourth period) to read out a voltage associated with the exposure of the photodiode. The control circuit is configured to read out a first voltage during the first period, read out a second voltage during the second period after stopping a supply of a reset voltage to the gate electrode, read out a third voltage in the fourth period after the exposure period, output a difference value between the first and the second voltages as PUF-ID data and a difference value between the third and the second voltages as detection data.

10 Claims, 16 Drawing Sheets

DETECTION DEVICE

CROSS-REFERENCE TO RELATED APPLICATIONS

This application is a Continuation of International Patent Application No. PCT/JP2021/030162, filed on Aug. 18, 2021, which claims the benefit of priority to Japanese Patent Application No. 2020-151570, filed on Sep. 9, 2020, the entire contents of which are incorporated herein by reference.

FIELD

An embodiment of the present invention relates to a detection device.

BACKGROUND

In recent years, in an electronic component including a semiconductor integrated circuit, an electronic device including the electronic component, or a system using the electronic component and electronic device, a counterfeit product or a pirated copy has become a problem. For example, to prevent the manufacture of the counterfeit product or the pirated copy of the electronic component, the electronic device, or the system using the electronic component and the electronic device, the use of an encryption technology using a secret key is one countermeasure against these problems.

Further, as a countermeasure against these problems, a solid-state imaging device capable of generating imaging data using a PUF (Physical Unclonable Function) is known.

SUMMARY

A detection device includes at least one pixel including a first electrode of a photo diode connected to a gate electrode of a first transistor connected between a power supply line and a read-out signal line, and a control circuit configured to control an operation of the at least one pixel in each of a reset period for resetting the gate electrode of the first transistor, an exposure period for exposing the photo diode, and a read-out period to read out a voltage associated with the exposure of the photo diode. The control circuit is configured to read out a first voltage from the read-out signal line during a first period of supplying a reset voltage to the gate electrode of the first transistor, read out a second voltage from the read-out signal line during a second period after stopping a supply of the reset voltage to the gate electrode of the first transistor, read out a third voltage from the read-out signal line in a fourth period being the read-out period after a third period being the exposure period, output a difference value between the first voltage and the second voltage as PUF-ID data and output a difference value between the third voltage and the second voltage as detection data, in the reset period.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. Further, in order to make the description clearer, the drawings may be schematically represented with respect to the width, thickness, shape, configuration, and the like of each part as compared with the actual embodiment, but are merely examples, and do not limit the interpretation of the present invention. It should be noted that the terms "first" and "second" applied to each element are convenient labels used to distinguish each element, and do not have any further meaning unless otherwise described.

A detection device includes a device for detecting biological information such as a fingerprint or a solid-state imaging device. The solid-state imaging devices includes, for example, CMOS (Complementary Metal Oxide Semiconductor) image sensors, or CCD (Charge Coupled Device) image sensors, and the like. A solid-state imaging device according to an embodiment of the present disclosure is, for example, a CMOS image sensor. In this specification, the solid-state imaging device will be described as an example, but the content of the present invention is not limited to the solid-state imaging device, and is also naturally applicable to a detection device for detecting biological information such as a fingerprint sensor. Further, in the case where the present invention is applied to a detection device such as a fingerprint sensor, imaging data to be described later may be referred to as detection data.

One of the objects of the present disclosure is to provide a detection device capable of generating imaging data using a PUF in order to suppress the production of a counterfeit product or a pirated copy.

In some embodiments described below, a detection device capable of generating imaging data using the PUF and driving methods of the detection device are exemplified.

1. First Embodiment

<1-1. Configuration of Solid-State Imaging Device 100>

Figure 1:
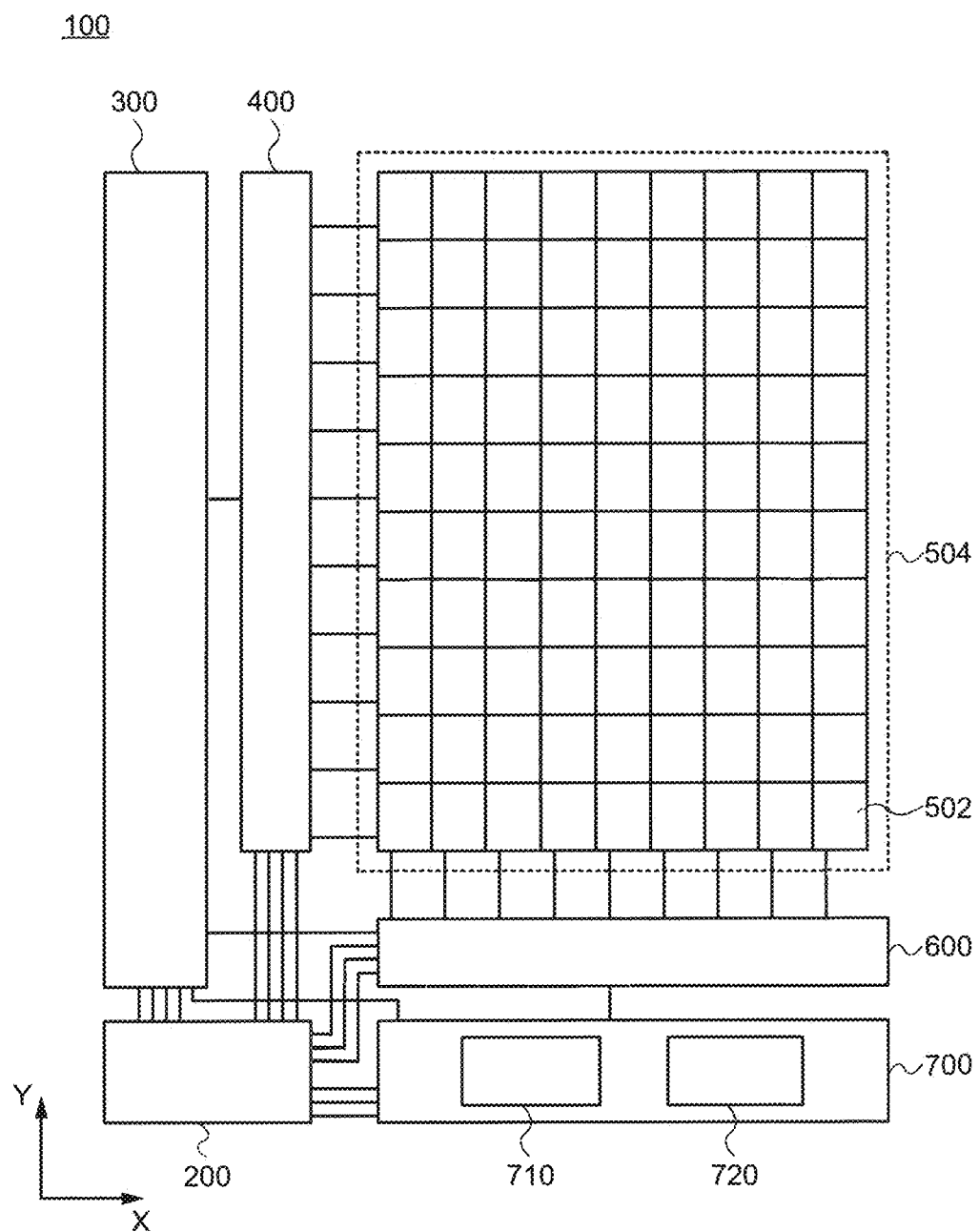
FIG. 1 is a plan view showing a configuration of a detection device according to an embodiment of the present invention.
Figure 2:
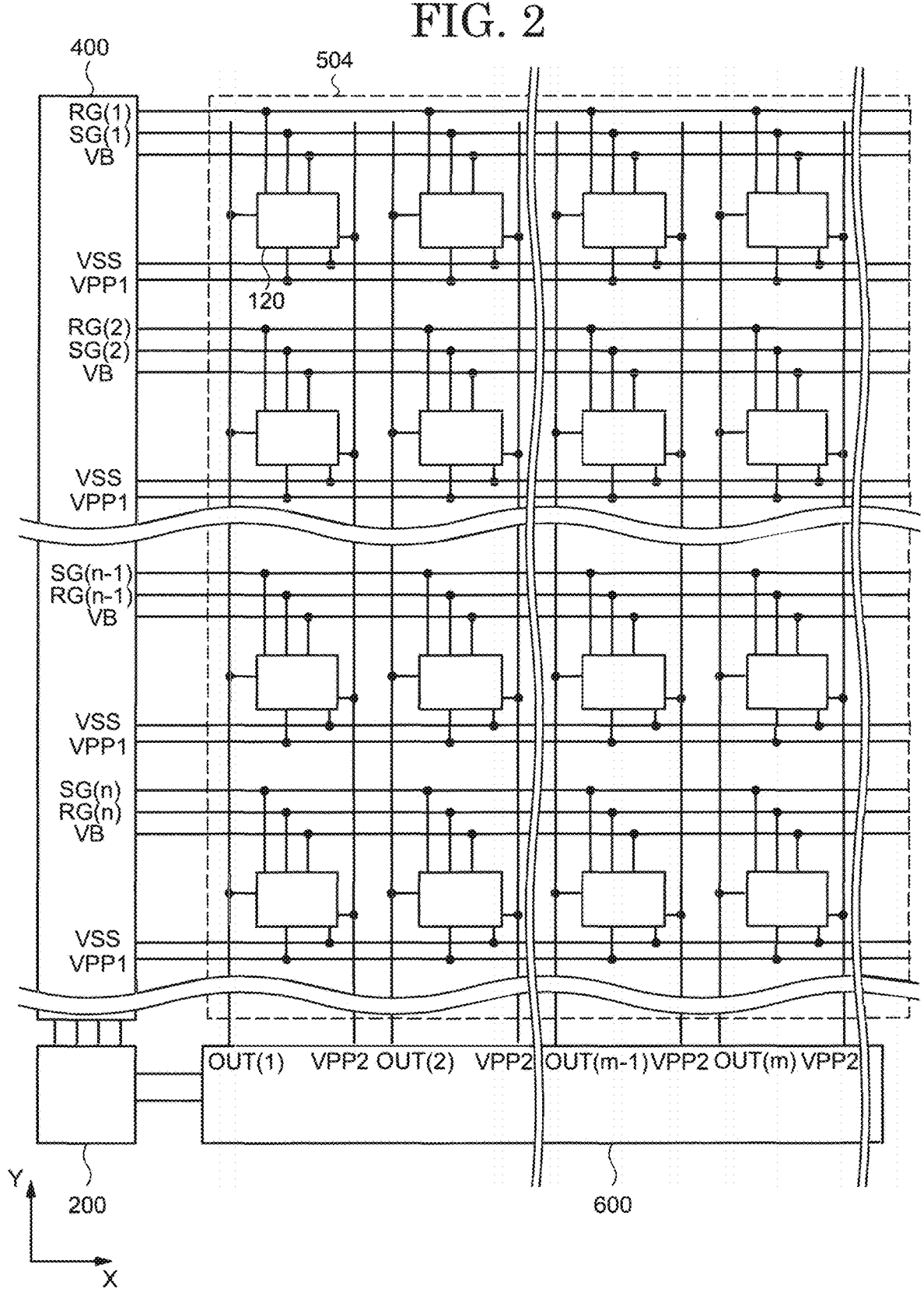
FIG. 2 is a plan view showing a configuration of a detection device according to an embodiment of the present invention.

FIG. 1 and FIG. 2 are schematic plan views showing a configuration of a solid-state imaging device 100 according to an embodiment of the present invention. The configuration of the solid-state imaging device 100 according to an embodiment of the present invention is not limited to the configuration shown in FIG. 1 and FIG. 2.

As shown in FIG. 1, the solid-state imaging device 100 includes a power supply circuit 200, a drive timing control circuit 300, a row selection circuit 400, a pixel section 504, a read-out circuit 600, and a signal processing circuit 700. The pixel section 504 includes a plurality of pixels 502 that capture images of a subject.

The plurality of pixels 502 are arranged in a matrix in an x-direction and a y-direction intersecting the x-direction. As will be described in detail later, each of the plurality of pixels 502 includes a plurality of transistors (FIG. 3), a plurality of capacitors (FIG. 3), and a light receiving element (FIG. 3) constituting a pixel circuit 120. In an embodiment of the invention, for example, the x-direction is referred to as a first direction and the y-direction is referred to as a second direction. Further, in an embodiment of the present invention, although an example is shown in which the light receiving element is a photoelectric converter that generates photovoltaic power, an embodiment of the present invention is not limited to this example. In an embodiment of the present disclosure, a photodiode (Photo Diode, PD) is shown as a specific example of the photoelectric converter.

The power supply circuit 200 is electrically connected to the drive timing control circuit 300, the signal processing circuit 700, the read-out circuit 600, and the row selection circuit 400. The power supply circuit 200 includes a logic circuit (not shown) and a voltage generation circuit (not shown). The power supply circuit 200 generates a signal or a power supply voltage using the logic circuit and the voltage generation circuit, and supplies the generated signal, power supply voltage, or power to the drive timing control circuit 300, the signal processing circuit 700, the read-out circuit 600, and the row selection circuit 400.

The drive timing control circuit 300 is electrically connected to the signal processing circuit 700, the read-out circuit 600, and the row selection circuit 400. For example, the drive timing control circuit 300 generates timing signals necessary for signal processing of the signal processing circuit 700, the read-out circuit 600, and the row selection circuit 400, and the like, and supplies the timing signals to the signal processing circuit 700, the read-out circuit 600, and the row selection circuit 400. The timing control signal generates, for example, a clock signal and a start pulse for controlling a row selection of the row selection circuit 400, and supplies each generated signal to the row selection circuit 400.

The row selection circuit 400 is arranged, for example, at a position adjacent to the pixel section 504 in the x-direction. For example, a reset signal line 412 (FIG. 3), a scanning signal line 410 (FIG. 3), a bias voltage supply line 418 (FIG. 3), a reference voltage line PVSS, and a first drive power supply line PVDD1 are connected to the row selection circuit 400. The scanning signal line 410 is connected to a plurality of pixels 502 arranged in the same row.

The read-out circuit 600 is connected to the signal processing circuit 700. The read-out circuit 600 is disposed, for example, at a position adjacent to the pixel section 504 in the y-direction. A plurality of read-out signal lines 420 (FIG. 3) and a second drive power supply line PVDD2 (FIG. 3) are connected to the read-out circuit 600. The read-out signal lines 420 are connected to a plurality of pixels 502 arranged in the same column.

The read-out circuit 600 includes, for example, an AD converter (not shown) and a horizontal transfer scanning circuit (not shown). The output signal OUT(n) (FIG. 4) supplied to the read-out signal line 420 is converted into a digital signal by the AD converter. The digital signal is transferred to the horizontal transfer scanning circuit. The horizontal transfer scanning circuit sequentially reads the digital signals for each column. The horizontal transfer scanning circuit can read out the output signal OUT(n) corresponding to each of the plurality of pixels 502 connected to the selected row as the digital signal by using the row selection circuit 400. The read-out circuit 600 receives the output signal OUT(n) and outputs the digital signal.

The signal processing circuit 700 includes a PUF-ID extraction circuit 710 and an image processing circuit 720. For example, the PUF-ID extraction circuit 710 generates an identifier (Identifier, ID) or a PUF-ID unique to the solid-state imaging device 100 using a plurality of digital signals output from the read-out circuit 600. For example, the image processing circuit 720 performs image processing such as gamma correction and noise removal on the plurality of digital signals output from the read-out circuit 600, and generates image data. The image data is, for example, imaging data of an imaged subject (an object). Although not shown, each of the signal processing circuit 700, the PUF-ID extraction circuit 710, and the image processing circuit 720 includes an arithmetic processing circuit and a storage circuit. In an embodiment of the present disclosure, the arithmetic processing circuit is, for example, a processor, a CPU, or the like, and the storage circuit is, for example, a volatile memory or a non-volatile memory.

As shown in FIG. 2, the row selection circuit 400 commonly supplies a reset signal RG(n), a scan signal SG(n), a bias voltage supply signal VB, a reference voltage VSS, and a first drive voltage VPP1 to each of the plurality of pixels 502 (the pixel circuit 120) located in the n-th row in the pixel section 504. The read-out circuit 600 supplies a second drive voltage VPP2 to each of the pixel circuits 120 of the plurality of pixels 502 located in the m-th column in the pixel section 504. In one embodiment of the present invention, m pixels 502 are arranged in the x-direction (the first direction) and n pixels are arranged in the y-direction (the second direction), for example. The numerical values m and n are natural numbers, respectively. For example, a pixel 502 arranged in the third row and fifth column is referred to as the pixel 502 at row 3 and column 5 or the pixel 502 at coordinates (3, 5).

Each of the plurality of pixels 502 may include a plurality of sub-pixels. For example, one pixel 502 may have three sub-pixels, and each of the three sub-pixels may have the pixel circuit 120. The three sub-pixels may have color filters that exhibit different colors. For example, of the three pixels, the first sub-pixel has a color filter that exhibits a red color, the second sub-pixel has a color filter that exhibits a green color, and the third sub-pixel has a color filter that exhibits a blue color. In addition, three pixels 502 may be set as one unit, and three pixels may have color filters having different colors. For example, of the three pixels, the first pixel has a color filter that is red, the second pixel has a color filter that is green, and the third pixel has a color filter that is blue. The configuration of the pixel and the sub-pixel is not limited to the example shown here. For example, the pixel 502 may have four or more sub-pixels having color filters exhibiting different colors, and the pixel 502 having four or more color filters exhibiting different colors may be one unit. The solid-state imaging device 100 according to an embodiment of the present invention includes pixels or sub-pixels having four or more color filters that exhibit different colors from each other, so that it is possible to generate imaging data with high color reproducibility of a subject.

Further, the solid-state imaging device 100 according to the embodiment of the present invention shows an example in which an arrangement of the plurality of pixels 502 is a stripe arrangement. The arrangement of the plurality of pixels 502 is not limited, and may be appropriately determined based on, for example, the application or specification of the solid-state imaging device 100.

Signals, power supplies, voltages, and power that are the basis of the respective signals, power supplies, voltages, and power may be supplied from an external circuit (not shown) to the power supply circuit 200, the drive timing control circuit 300, and the signal processing circuit 700. Based on the respective signals, the power supply, the voltage, and the power, the desired signal, the desired power supply, the desired voltage, and the desired power processed in the power supply circuit 200, the drive timing control circuit 300, and the signal processing circuit 700 may be supplied to the row selection circuit 400, the pixel section 504, and the read-out circuit 600.

<1-2. Configuration of Pixel 502>

Figure 3:
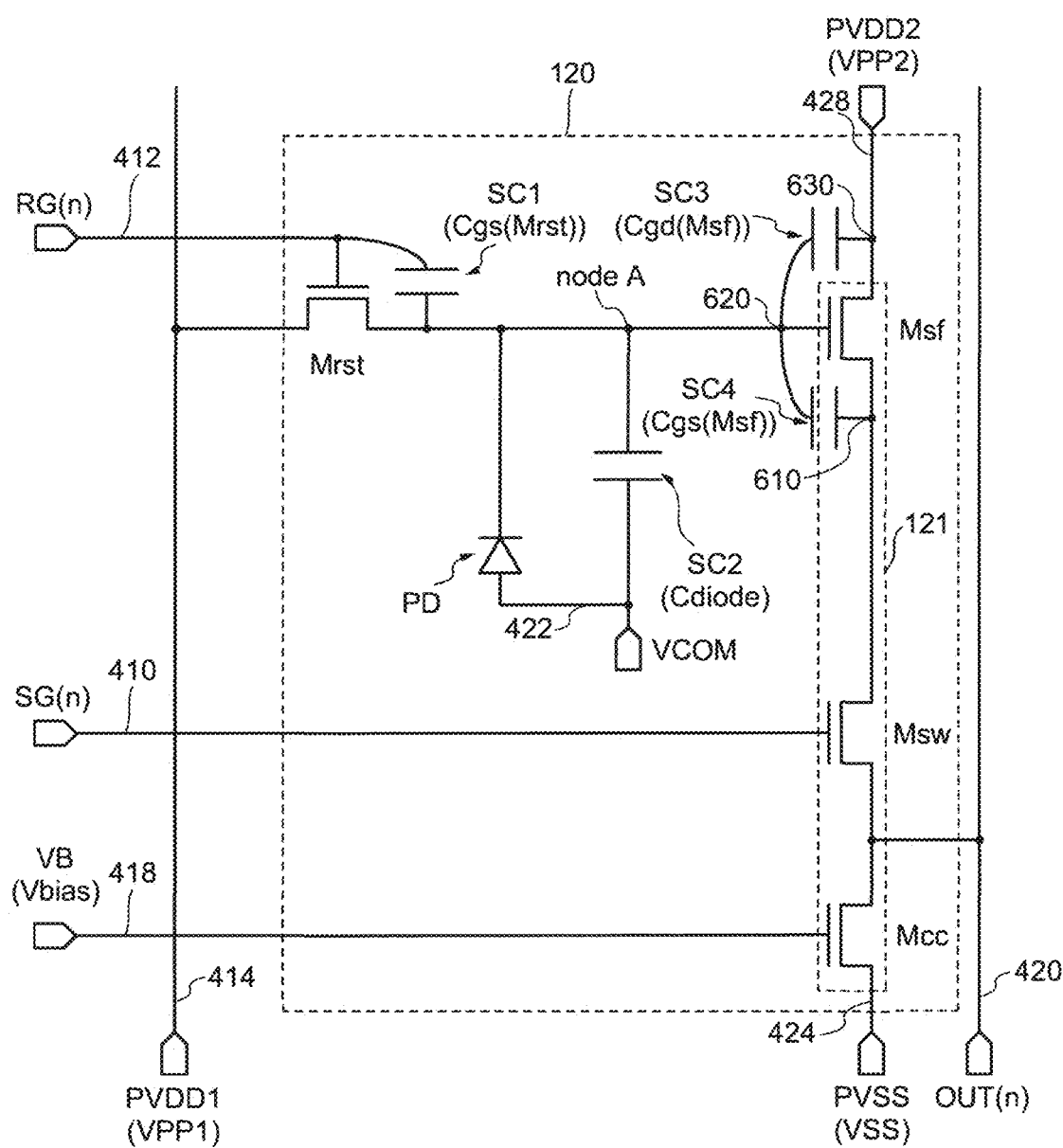
FIG. 3 is a circuit diagram showing a pixel circuit according to an embodiment of the present invention.

FIG. 3 is a circuit diagram showing a pixel circuit 120 according to an embodiment of the present invention. Each of the plurality of pixels 502 includes a plurality of transistors constituting the pixel circuit 120, the capacitor, and the photo diode (PD). FIG. 3 shows components of the pixel circuit 120 of the pixel 502 at the n-th row and m-th column shown in FIG. 2. The configuration of the pixel circuit 120 shown in FIG. 3 is an example, and the configuration of the pixel circuit 120 is not limited to the configuration shown in FIG. 3. The same or similar configurations as those in FIG. 1 and FIG. 2 will not be described here.

As shown in FIG. 3, the pixel circuit 120 includes, for example, a reset transistor Mrst (a first switch), a driving transistor Msf (a second switch), a selection transistor Msw (a third switch), a load transistor Mcc (a fourth switch), a photo diode (PD), a first capacitor SC1, a second capacitor SC2, a third capacitor SC3, and a fourth capacitor SC4. Each of these transistors has a gate electrode (a first electrode), and a pair of electrodes including a source electrode and a drain electrode (a pair of electrodes including a second electrode and a third electrode). Each of these capacitors has a pair of electrodes (the first electrode and the second electrode). Note that the function as the source and the function as the drain of each electrode may be interchanged depending on the voltage applied to the source electrode and drain electrode.

The driving transistor Msf, the selection transistor Msw, and the load transistor Mcc constitute a source follower 121. The source follower 121 is a so-called drain ground circuit, and supplies a current from the second drive power supply line PVDD2 to the reference voltage line PVSS, and outputs the output signal OUT(n) corresponding to the voltage supplied to a gate electrode 620 (a first electrode 620) of the driving transistor Msf.

As a power supply for driving the pixel 502, the first drive voltage VPP1 is supplied from the first drive power supply line PVDD1, the second drive voltage VPP2 is supplied from the second drive power supply line PVDD2, a reference voltage VSS is supplied from the reference voltage line PVSS, and a common voltage is supplied from a common potential line VCOM. The first drive power supply line PVDD1 is a first drive power supply line 414, the second drive power supply line PVDD2 is a second drive power supply line 428, and the reference voltage line PVSS is a reference voltage line 424. The common potential line VCOM is connected to the common electrode 422.

In one embodiment of the present disclosure, the first drive power supply line PVDD1, the second drive power supply line PVDD2, the reference voltage line PVSS, and the common potential line VCOM are commonly provided for the plurality of pixels 502, but the first drive power supply line PVDD1, the second drive power supply line PVDD2, the reference voltage line PVSS, and the common potential line VCOM may not be commonly provided for the plurality of pixels 502. The first drive voltage VPP1 may be the same as or substantially the same as the second drive voltage VPP2 and may be smaller than the second drive voltage VPP2. The first drive voltage VPP1 may be a constant voltage and may be any voltage capable of supplying the constant voltage to a node A and resetting or initializing the pixel 502. The common voltage may be the same as or substantially the same as the reference voltage VSS and may be smaller than the reference voltage VSS. The common voltage may be a constant voltage and may be any voltage capable of suppressing fluctuation of the common electrode 422.

In addition, in one embodiment of the present disclosure, the bias voltage supply signal VB, the reference voltage line PVSS, and the first drive power supply line PVDD1 are provided in the row selection circuit 400, and a bias voltage Vbias, the reference voltage VSS, and the first drive voltage VPP1 are supplied from the row selection circuit 400 to the plurality of pixels 502, but the present disclosure is not limited to this example. The bias voltage supply signal VB, the reference voltage line PVSS, and the first drive power supply line PVDD1 may be provided in the read-out circuit 600, and a part of the bias voltage supply signal VB, the reference voltage line PVSS, and the first drive power supply line PVDD1 may be provided in the row selection circuit 400, and the remaining part may be provided in the read-out circuit 600. Although the second drive power supply line PVDD2 is provided in the read-out circuit 600 and the second drive voltage VPP2 is supplied from the read-out circuit 600 to the plurality of pixels 502, the present invention is not limited to this example. The second drive power line PVDD2 may be provided in the row selection circuit 400. The bias voltage supply signal VB, the reference voltage line PVSS, the first drive power supply line PVDD1, and the second drive power supply line PVDD2 may be provided in the power supply circuit 200, and the bias voltage Vbias, the reference voltage VSS, the first drive voltage VPP1, and the second drive voltage VPP2 may be supplied from the power supply circuit 200 to the plurality of pixels 502. Although not shown, for example, the common potential line VCOM is provided in the power supply circuit 200, and the common voltage is supplied from the power supply circuit 200 to the common electrodes 422 of the plurality of pixels 502. The common potential line VCOM may be provided in the power supply circuit 200, and the common voltage may be supplied from the power supply circuit 200 to the common electrodes 422 of the plurality of pixels 502 through the row selection circuit 400 or the read-out circuit 600. In the solid-state imaging device 100 according to the embodiment of the present invention, the arrangement of the power supply lines and the like may be appropriately changed in accordance with the application, specifications, and the like.

The reset transistor Mrst supplies the first drive voltage VPP1 to the node A based on the reset signal RG(n) to bring the pixel 502 into the reset state or the initialization state. The node A is connected to the gate electrode 620 (the first electrode 620) of the driving transistor Msf, the first electrode of the photo diode (PD), the second electrode of the first capacitor, and the second electrode of the second capacitor.

The driving transistor Msf adjusts the current flowing through the source follower 121 of the pixel 502 in the reset state or the initialization state using the input first drive voltage VPP1. Further, the driving transistor Msf adjusts the current flowing through the source follower 121 using the photovoltaic power generated based on the light received by the photo diode (PD) in accordance with the exposure of the pixel 502. Note that, in the embodiment of the present disclosure, the exposure of the pixel 502 may be referred to as the reception of light by the pixel 502 or to expose the pixel 502, and the reception of light by the photo diode (PD) may be referred to as the exposure of the photo diode (PD) or to expose the photo diode (PD).

The selection transistor Msw controls whether to drive the source follower 121 based on the scan signal SG(n). That is, the selection transistor Msw controls whether the source follower 121 supplies a current based on the scan signal SG(n).

The load transistor Mcc controls whether a constant current flows from the second drive power supply line PVDD2 to the reference voltage line PVSS based on the bias voltage supply signal VB. When the bias voltage Vbias is input to the load transistor Mcc, the load transistor Mcc becomes conductive, and the constant current flows from the second drive power supply line PVDD2 to the reference voltage line PVSS. That is, the load transistor Mcc serves as a constant current source.

The first capacitor SC1 is provided between the gate electrode (the first electrode) of the reset transistor Mrst and the source electrode or the drain electrode (the second electrode or the third electrode) of the reset transistor Mrst. The first capacitor SC1 is provided between the reset signal line 412 and the node A. A capacitance value of the first capacitor SC1 is a capacitance value Cgs (Mrst). The third capacitor SC3 is provided between the gate electrode 620 (the first electrode 620) of the driving transistor Msf and the source electrode or the drain electrode (a third electrode 630) of the driving transistor Msf. The third capacitor SC3 is provided between the node A and the second drive power supply line 428. A capacitance value of the third capacitor SC3 is a capacitance value Cgd (Msf). The fourth capacitor SC4 is provided between the gate electrode 620 (the first electrode 620) of the driving transistor Msf and the source electrode or the drain electrode (a second electrode 610) of the driving transistor Msf. A capacitance value of the fourth capacitor SC4 is a capacitance value Cgs (Msf). The first capacitor SC1, the third capacitor SC3, and the fourth capacitor SC4 are, for example, parasitic capacitances and additional capacitances between the transistors and the wires, respectively. The first capacitor SC1, the third capacitor SC3, and the fourth capacitor SC4 may hold a charge corresponding to the first drive voltage VPP1 supplied to the node A, or may hold a charge corresponding to the photovoltaic power generated based on the light received by the photo diode (PD).

The second capacitor SC2 holds charges corresponding to the first drive voltage VPP1 supplied to the node A. The second capacitor SC2 holds charges corresponding to the photovoltaic power generated based on the light received by the photo diode (PD). A capacitance value of the second capacitor SC2 is a capacitance value Cdiode. The solid-state imaging device 100 according to an embodiment of the present disclosure includes the second capacitor SC2, whereby discharging of electric charges corresponding to the first drive voltage VPP1 can be suppressed, and the reset state or the initialization state of the pixel 502 can be maintained. Further, the solid-state imaging device 100 according to an embodiment of the present disclosure includes the second capacitive device SC2, whereby discharging of electric charges corresponding to photovoltaic power can be suppressed and the exposure condition of the pixel 502 can be maintained. As a result, the solid-state imaging device 100 according to an embodiment of the present disclosure can maintain the voltages in the reset state, the initialization state, and the exposure state constant, so that it is possible to stably generate a PUF-ID capable of suppressing the production of a counterfeit product, and to stably generate imaging data of the subject, and to stably generate imaging data including the PUF-ID capable of suppressing counterfeiting.

The gate electrode (the first electrode) of the reset transistor Mrst is electrically connected to the reset signal line 412. The reset signal RG(n) is supplied to the reset signal line 412. A conductive state and a non-conductive state of the reset transistor Mrst are controlled by the signal supplied to the reset signal line 412. When the signal supplied to the reset signal line 412 is at a high (High, H) level, the reset transistor Mrst becomes conductive. When the signal supplied to the reset signal line 412 is at the low (Low, L) level, the reset transistor Mrst becomes non-conductive. The source electrode (the second electrode) of the reset transistor Mrst is electrically connected to the first drive power supply line 414. The first drive voltage VPP1 is supplied to the first drive power supply line 414. The drain electrode (the third electrode) of the reset transistor Mrst is connected to the node A. In an embodiment of the present disclosure, the high level may be the first drive voltage VPP1, or may be the second drive voltage VPP2, and the low level may be the reference voltage VSS, or may be the common voltage.

The gate electrode (the first electrode) of the selection transistor Msw is electrically connected to the scanning signal line 410. The scan signal SG(n) is supplied to the scanning signal line 410. The conductive state and the non-conductive state of the selection transistor Msw are controlled by a signal supplied to the scan signal SG(n). When the signal supplied to the scan signal SG(n) is at a high level, the selection transistor Msw is turned on. When the signal supplied to the scan signal SG(n) is at a low level, the selection transistor Msw is not conductive. The source electrode (the second electrode) of the select transistor Msw is electrically connected to the read-out signal line 420 and the drain electrode (the third electrode) of the load transistor Mcc. The output signal OUT(n) is supplied to the read-out signal line 420.

The gate electrode (the first electrode) of the load transistor Mcc is electrically connected to the bias voltage supply line 418. The bias voltage supply line 418 is supplied with the bias voltage supply signal VB. The conductive state and the non-conductive state of the load transistor Mcc are controlled by a voltage supplied to the bias voltage supply signal VB. When the voltage supplied to the bias voltage supply signal VB is the bias voltage Vbias, the load transistor Mcc becomes conductive, and the load transistor Mcc flows a constant current. When the voltage supplied to the bias voltage supply signal VB is at the low level, the load transistor Mcc becomes non-conductive. The source electrode (the second electrode) of the load transistor Mcc is electrically connected to the reference voltage line 424.

The first electrode of the photo diode (PD) is electrically connected to the node A, and the second electrode of the photo diode (PD) is electrically connected to the common electrode 422. The common voltage is supplied to the common electrode 422 from the common potential line VCOM.

The first electrode of the first capacitor SC1 is electrically connected to a gate electrode (the first electrode) of the reset transistor Mrst. The second electrode of the first capacitor SC1 is electrically connected to the drain electrode (the third electrode) and the node A of the reset transistor Mrst. The first electrode of the second capacitor SC2 is electrically connected to the node A. The second electrode of the second capacitor SC2 is electrically connected to the common electrode 422.

The first electrode of the third capacitor SC3 is electrically connected to the gate electrode 620 (the first electrode 620) of the driving transistor Msf and the node A. The second electrode of the third capacitor SC3 is electrically connected to the drain electrode 630 (the third electrode 630) of the driving transistor Msf and the second drive power supply line 428. The second drive voltage VPP2 is supplied to the second drive power supply line 428. The first electrode of the fourth capacitor SC4 is electrically connected to the gate electrode 620 (the first electrode 620) of the driving transistor Msf and the node A. The second electrode of the fourth capacitor SC4 is electrically connected to the source electrode 610 (the second electrode 610) of the driving transistor Msf.

In an embodiment of the present disclosure, the conductive state indicates a state in which the source electrode and the drain electrode of the transistor are conductive and the transistor is turned ON. Further, in one embodiment of the present disclosure, the non-conductive state indicates a state in which the source electrode and the drain electrode of the transistor are non-conductive and the transistor is turned OFF. Note that in each transistor, the source electrode and the drain electrode may be interchanged depending on the voltage of each electrode. In addition, even in the case where the transistor is in the off state, it can be easily understood by a person skilled in the art that a slight current flows, such as a leakage current.

In one embodiment of the invention, each transistor has a Group 14 element, such as silicon or germanium, in a channel region. Further, each transistor may have an oxide having semiconductor characteristics in the channel region. For example, the channel regions of the transistors may include low-temperature polysilicon (LTPS), and may include oxide semiconductors including indium (In), gallium (Ga), zinc (Zn), and oxygen (O). In the solid-state imaging device 100 according to an embodiment of the present invention, the configuration of the transistor, the connection of the storage capacitor, and the voltage of the power supply and the like may be appropriately adapted according to the application and specifications.

In an embodiment of the present invention, some transistors may be shared among a plurality of adjacent pixels. For example, one reset transistor Mrst may be provided in each row, one reset transistor Mrst for each row may be provided in the row selection circuit 400, one reset transistor Mrst may be provided for a plurality of rows, and one reset transistor Mrst for a plurality of rows may be provided in the row selection circuit 400.

<1-3. Driving Method of Solid-State Imaging Device 100>

Figure 4:
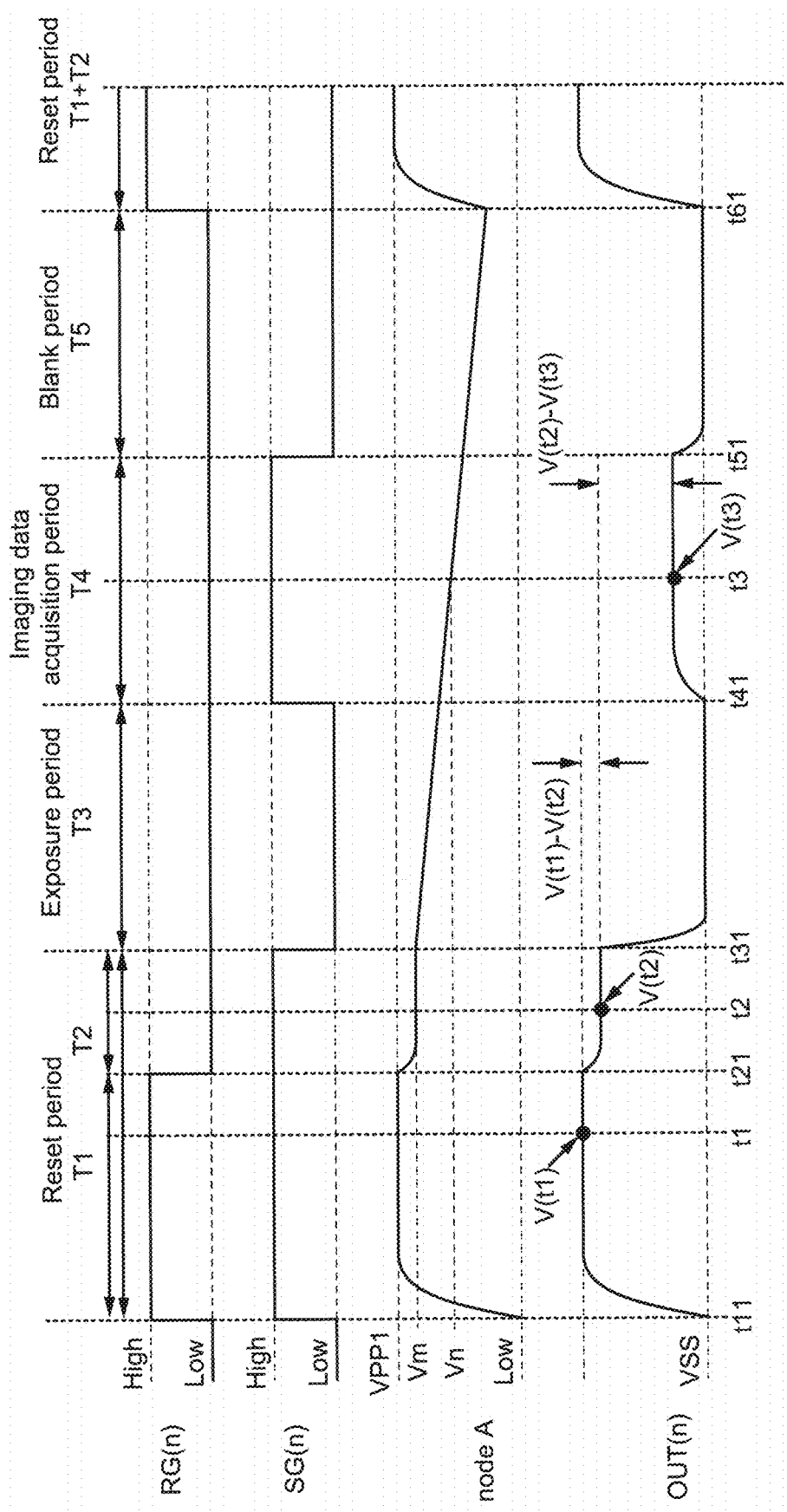
FIG. 4 is a timing chart showing a driving method of a detection device according to an embodiment of the present invention.

FIG. 4 is a schematic diagram showing a timing chart of the solid-state imaging device 100 according to an embodiment of the present invention. FIG. 5 to FIG. 8 are schematic diagrams showing the operation states of the pixels 502 at the timings shown in FIG. 4. Driving methods shown in FIG. 4 to FIG. 8 are examples of a driving method of the solid-state imaging device 100 according to an embodiment of the present invention, and the driving method of the solid-state imaging device 100 is not limited to the driving methods shown in FIG. 4 to FIG. 8. Descriptions of the same or similar configurations as those in FIG. 1 to FIG. 3 will be omitted.

For example, the row selection circuit 400 selects each pixel from the plurality of pixels 502 in the first row to the plurality of pixels 502 in the last row for each row. For each selected row, the light received by each pixel 502 is converted into an analog signal (photovoltaic power) by the photo diode (PD) corresponding to each pixel. Each analog signal photoelectrically converted for each row is output from each pixel. The AD converter included in the read-out circuit 600 converts the analog signal output for each row into a digital signal. The horizontal transfer scanning circuit included in the read-out circuit 600 transmits the converted digital signal for each row to the signal processing circuit 700 for each row. The PUF-ID extraction circuit 710 included in the signal processing circuit 700 receives the digital signal converted for each row, and generates the PUF-ID unique to the solid-state imaging device 100 using the digital signal converted for each row. Further, the image processing circuit 720 included in the signal processing circuit 700 receives the digital signal converted for each row, and generates imaging data of the subject using the digital signal converted for each row. Further, the signal processing circuit 700 combines data of the PUF-ID unique to the solid-state imaging device 100 and imaging data of the subject, and generates imaging data including the PUF-ID capable of suppressing counterfeiting.

Here, a driving method of the solid-state imaging device 100 for driving the plurality of pixels 502 electrically connected to the scanning signal line 410 of the n-th row will be described. As shown in FIG. 4, the driving method of the solid-state imaging device 100 includes a reset period, an exposure period, an imaging data acquisition period, and a blank period. FIG. 4 shows, as an example, a timing chart for driving the plurality of pixels 502 electrically connected to the scanning signal lines 410 in the n-th row. FIG. 5 to FIG. 8 show operation states of the pixel 502 at the n-th row and m-th column. In the driving method shown in FIG. 4, driving from the plurality of pixels 502 in the first row to the plurality of pixels 502 in the last row is repeatedly performed, and the digital signal converted for each row is processed by the signal processing circuit 700. That is, the driving method shown in FIG. 4 is repeatedly executed in each of the plurality of pixels 502, and the digital signal converted for each row is processed by the signal processing circuit 700. The signal processing circuit 700 can generate the data of the PUF-ID unique to the solid-state imaging device 100 and imaging data of the subject, and generate imaging data including the PUF-ID capable of suppressing counterfeiting using the data of the PUF-ID unique to the solid-state imaging device 100 and imaging data of the subject.

<1-3-1. Reset Period>

The reset period is a period in which the node A of the pixel 502 is reset and the pixel 502 is placed in the reset state or the initialization state. As shown in FIG. 4, the reset period has a first period T1 and a second period T2. The first period T1 is a period in which a first voltage V(t1) is acquired. The first voltage V(t1) is the output signal OUT(n) corresponding to the voltage of the node A. The second period T2 is a period in which a second voltage V(t2) is acquired. The second voltage V(t2) is the output signal OUT(n) corresponding to the voltage drop of the voltage at the node A. In an embodiment of the present disclosure, the state of the pixel 502 in the first period T1 may be referred to as a first reset state or a first initialization state, and the state of the pixel 502 in the second period T2 may be referred to as a second reset state or a second initialization state. In addition, the first reset state or the first initialization state, and the second reset state or the second initialization state in the reset period may be referred to as a reset state or an initialization state. Further, although detailed later, the reset period is also a period in which the first voltage V(t1) is acquired in the first period T1 and the second voltage V(t2) is acquired in the second period T2.

First, with reference to FIG. 4 and FIG. 5, driving methods in the first period T1 will be described. As shown in FIG. 4, at time t11, the reset signal RG(n) changes from a low level to a high level, and the reset signal RG(n) is supplied with the high level. At the time t11, the selection signal SG(n) changes from a low level to a high level, and the selection signal SG(n) is supplied with the high level. Although not shown, when the solid-state imaging device 100 starts driving, the bias voltage supply signal VB changes from the low level or from the reference voltage VSS to the bias voltage Vbias, and the bias voltage supply signal VB is supplied with the bias voltage Vbias. When the reset transistor Mrst becomes conductive, the first drive voltage VPP1 is supplied to the node A from the first drive power supply line 414. Consequently, the voltage of the node A gradually increases from the low level at the time t11, and becomes the first drive voltage VPP1 at the time t1. That is, when the reset transistor Mrst becomes conductive, the reset transistor Mrst supplies the first drive voltage VPP1 from the first drive power supply line 414 to the node A (the gate electrode 620 of the driving transistor Msf). In an embodiment, the first drive power supply line PVDD1 and the first drive power supply line 414 may be referred to as a reset voltage line, and the first drive voltage VPP1 may be referred to as a reset voltage.

Figure 5:
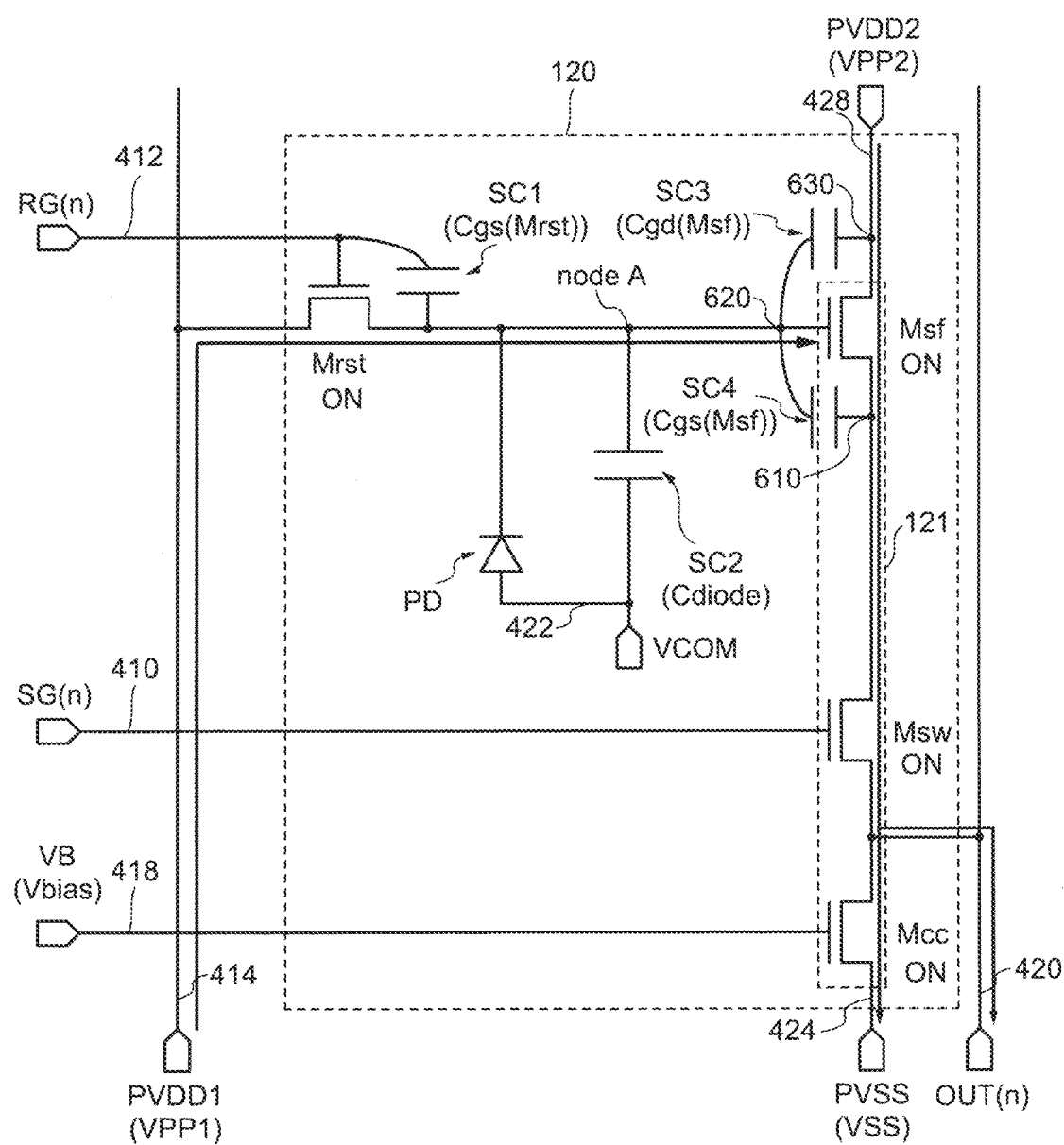
FIG. 5 is a schematic view showing an operation state of a pixel at the timing shown in FIG. 4.

Thus, as shown in FIG. 5, the reset transistor Mrst, the selection transistor Msw, and the load transistor Mcc are conductive.

When the solid-state imaging device 100 starts driving, the second electrode 610 of the driving transistor Msf is supplied with the reference voltage PVSS from the reference voltage line VSS, and the third electrode 630 of the driving transistor Msf is supplied with the second drive voltage VPP2 from the second drive power supply line 428. As shown in FIG. 5, a voltage corresponding to VPP1−VSS is applied between the gate electrode 620 (the first electrode 620) of the driving transistor Msf and the second electrode 610 of the driving transistor Msf, and a voltage corresponding to VPP2−VSS is applied between the third electrode 630 of the driving transistor Msf and the second electrode 610 of the driving transistor Msf. Therefore, the driving transistor Msf is turned to the conductive state, and the source follower 121 causes a current to flow from the second drive power supply line PVDD2 to the reference voltage line PVSS. Thereafter, the source follower 121 supplies a voltage corresponding to the threshold voltage Vth (Msf) of the driving transistor Msf between the gate electrode 620 (the first electrode 620) of the driving transistor Msf and the second electrode 610 of the driving transistor Msf. That is, the voltage VPP1−Vth (Msf) is supplied to the second electrode 610 of the driving transistor Msf. Consequently, the pixel 502 (the source follower 121) outputs an output OUT(n) corresponding to the voltage VPP1−Vth (Msf) supplied to the second electrode 610 of the driving transistor Msf.

As shown in FIG. 5, the second drive voltage VPP2 is supplied to the output signal OUT(n) from the second drive power supply line 428. Consequently, the voltage of the output signal OUT(n) gradually increases from the low level at the time t11, and becomes the first voltage V(t1) at the time t1. The first voltage V(t1) is supplied to the read-out signal line 420. The read-out circuit 600 reads the first voltage V(t1) supplied to the read-out signal line 420. Further, the read-out circuit 600 may convert the first voltage V(t1) into a digital signal and transmit the digital signal to the signal processing circuit 700, and the signal processing circuit 700 may receive the digital signal of the first voltage V(t1). As described above, in the solid-state imaging device 100 according to the embodiment of the present disclosure, the first period T1 is a period in which the first voltage V(t1) is acquired.

Next, with reference to FIG. 4 and FIG. 6, driving methods in the second period T2 will be described. As shown in FIG. 4, at time t21, the reset signal RG(n) changes from a high level to a low level, and the reset signal RG(n) is supplied with the low level. At the time t21, the selection signal SG(n) is maintained at the high level. Although not shown, the bias voltage supply signal VB maintains the bias voltage Vbias.

Figure 6:
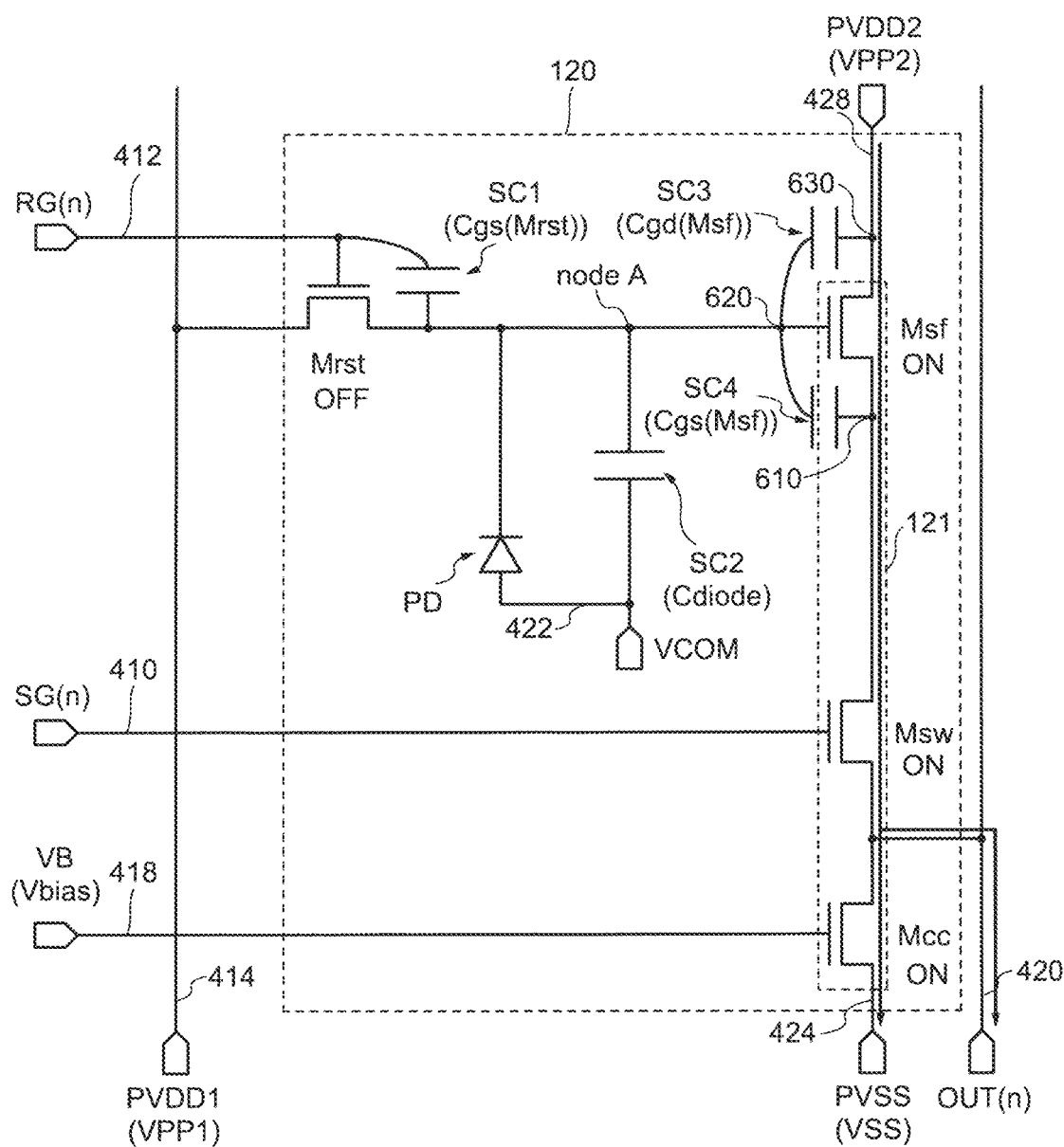
FIG. 6 is a schematic view showing an operation state of a pixel at the timing shown in FIG. 4.

Therefore, as shown in FIG. 6, the reset transistor Mrst is in the non-conductive state, and the selection transistor Msw and the load transistor Mcc are maintained in the conductive state.

As shown in FIG. 6, as the reset transistor Mrst is turned from the conductive state to the non-conductive state, the first drive voltage VPP1 is not supplied to the node A from the first drive power supply line 414. That is, when the reset transistor Mrst becomes non-conductive, the reset transistor Mrst stops supplying the first drive voltage VPP1 from the first drive power supply line 414 to the node A (the gate electrode 620 of the driving transistor Msf). Further, as shown in FIG. 4 and FIG. 6, as the reset transistor Mrst is turned from the conductive state to the non-conductive state, the voltage of the node A decreases due to, for example, the first capacitance element SC1, the second capacitance element SC2, the third capacitance element SC3, and the fourth capacitance element SC4 provided between the reset transistor Mrst and the node A. That is, the voltage of the node A gradually decreases from the first drive voltage VPP1 at the time t21, and becomes a voltage Vm.

Here, a voltage corresponding to the threshold voltage Vth (Msf) of the driving transistor Msf is supplied between the gate electrode 620 (the first electrode 620) of the driving transistor Msf and the second electrode 610 of the driving transistor Msf. That is, the voltage corresponding to Vm−Vth (Msf) is supplied to the second electrode 610 of the driving transistor Msf. Consequently, the pixel 502 (the source follower 121) outputs an output OUT(n) corresponding to the voltage Vm−Vth (Msf) supplied to the second electrode 610 of the driving transistor Msf.

As shown in FIG. 6, the second drive voltage VPP2 is supplied to the output signal OUT(n) from the second drive power supply line 428. Consequently, the voltage of the output signal OUT(n) gradually decreases from the low level at the time t21, and becomes the second voltage V(t2) at the time t2. The second voltage V(t2) is supplied to the read-out signal line 420. The read-out circuit 600 reads out the second voltage V(t2) supplied to the read-out signal line 420. Further, the read-out circuit 600 may convert the second voltage V(t2) into a digital signal and may transmit the digital signal to the signal processing circuit 700, and the signal processing circuit 700 may receive the digital signal of the second voltage V(t2). As described above, in the solid-state imaging device 100 according to the embodiment of the present disclosure, the second period T2 is a period in which the second voltage V(t2) is acquired.

In the reset period, the node A is supplied with the voltage Vm, and the voltage of the node A is maintained at the voltage Vm. As a result, the pixel 502 is reset or initialized, and the state of the pixel 502 is in the second reset state or the second initialization state.

For example, between the time t2 and time t31 of the reset period, the signal processing circuit 700 may generate a voltage (V(t1)−V(t2)) obtained by subtracting the second voltage V(t2) from the first voltage V(t1) using the digital signal of the first voltage V(t1) and the digital signal of the second voltage V(t2). The second voltage V(t2) is smaller than the first voltage V(t1), and the difference between the first voltage V(t1) and the second voltage V(t2) is the voltage (V(t1)−V(t2)).

Here, the voltage (V(t1)−V(t2)) obtained by subtracting the second voltage V(t2) from the first voltage V(t1) is a change in voltage due to a so-called feedthrough in which the voltage of the gate electrode of the reset transistor Mrst changes instantaneously, and the voltage of the drain electrode of the reset transistor Mrst (that is, the voltage of the node A) changes instantaneously by coupling the gate electrode of the reset transistor Mrst and the first capacitor SC1. In one embodiment, V(t1)−V(t2) is referred to as the feedthrough. The feedthrough voltage is expressed by Equation (1) below. ΔVg is the change in the voltage of the gate electrode of the reset transistor Mrst. The PUF-ID extraction circuit 710 included in the signal processing circuit 700 generates the PUF-ID data unique to the solid-state imaging device 100 using the feedthrough voltage. The PUF-ID may be generated in a reset period.

$$V(t1) - V(t2) = \Delta Vg \times \frac{Cgs(Mrst)}{Cdiode + Cgs(Mrst) + Cgd(Msf) + Cgs(Msf)} \quad (1)$$

<1-3-2. Exposure Period>

The exposure period is a period during which the pixel 502 is brought into an exposure state. That is, the exposure period is a period in which the solid-state imaging device 100 adjusts the current flowing through the source follower 121 using the photovoltaic power generated based on the light received by the photo diode (PD) in accordance with the exposure of the pixel 502. As shown in FIG. 4, the exposure period has a third period T3.

Figure 7:
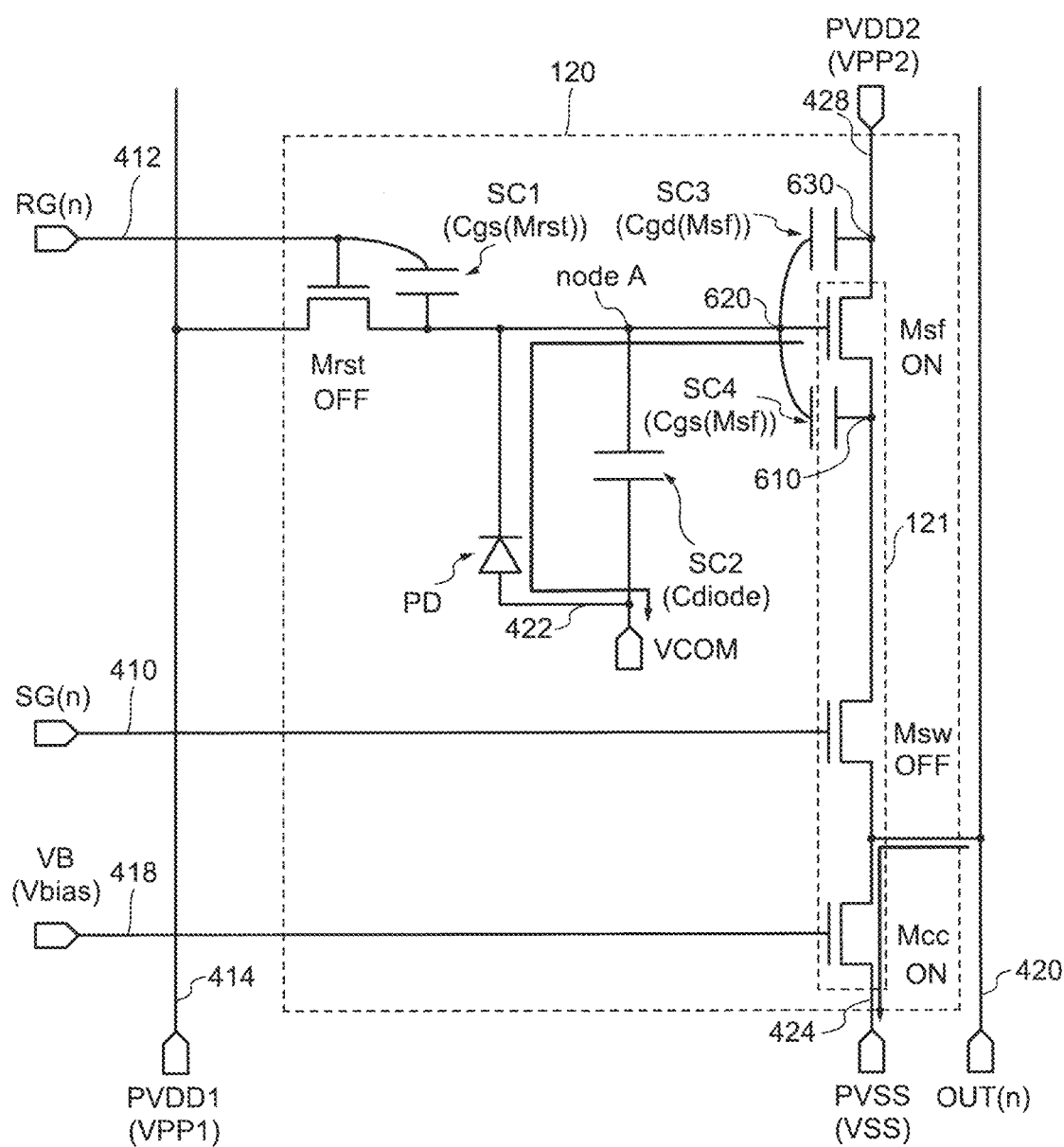
FIG. 7 is a schematic view showing an operation state of a pixel at the timing shown in FIG. 4.

With reference to FIG. 4 and FIG. 7, driving methods in the third period T3 will be described. As shown in FIG. 4, the reset signal RG(n) is maintained at the low level during time t41 from the time t31. At the time t31, the selection signal SG(n) changes from a high level to a low level, and the selection signal SG(n) is supplied with the low level. The selection signal SG(n) remains at the low level until the time t41. Although not shown, the bias voltage supply signal VB maintains the bias voltage Vbias from the time t31 to the time t41.

Therefore, as shown in FIG. 7, during the period from the time t31 to the time t41, the reset transistor Mrst and the selection transistor Msw are in the non-conductive state, and the load transistor Mcc is in the conductive state.

With the exposure of the pixel 502, photovoltaic power is generated based on the light received by the photo diode (PD). Consequently, during time t31 to time t41, current flows from the node A toward the common electrode 422, and the voltage at the node A gradually decreases from the voltage Vm. Further, during the period from the time t31 to the time t41, the selection transistor Msw is in the non-conductive state and the load transistor Mcc is in the conductive state, so that the current flows from the read-out signal line 420 toward the reference voltage line PVSS, and the voltage of the output signal OUT(n) becomes the reference voltage VSS.

<1-3-3. Imaging Data Acquisition Period>

The imaging data acquisition period is a period in which the pixel 502 is in a state in which imaging data can be acquired and imaging data of the subject is acquired. The second voltage V(t2) and the third voltage V(t3) are used to generate imaging data. As shown in FIG. 4, the imaging data acquiring period has a fourth period T4.

Figure 8:
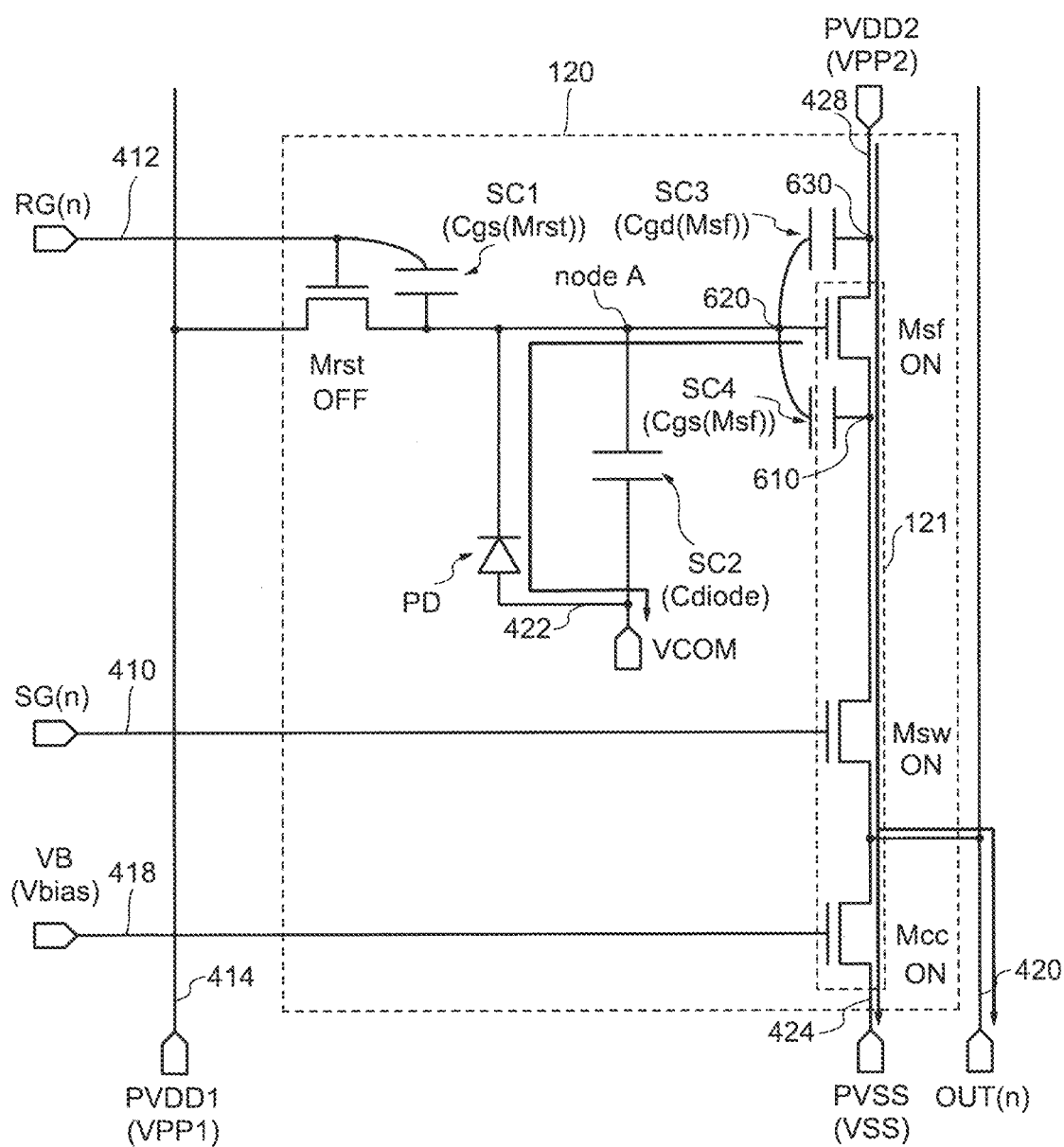
FIG. 8 is a schematic view showing an operation state of a pixel at the timing shown in FIG. 4.

With reference to FIG. 4 and FIG. 8, driving methods in the fourth period T4 will be described. As shown in FIG. 4, the reset signal RG(n) is maintained at a low level during time t51 from the time t41. At time t41, the selection signal SG(n) changes from a low level to a high level, and the selection signal SG(n) is supplied with the high level. The selection signal SG(n) maintains the high level until the time t51. Although not shown, the bias voltage supply signal VB maintains the bias voltage Vbias from the time t41 to the time t51.

Therefore, as shown in FIG. 8, during the period from the time t41 to the time t51, the reset transistor Mrst is in the non-conductive state, and the selection transistor Msw and the load transistor Mcc are in the conductive state.

During the period from the time t41 to the time t51, the pixel 502 generates photovoltaic power based on the light received by the photo diode (PD) in accordance with the exposure. Consequently, the current continues to flow from the node A toward the common electrode 422 from the time t41 to the time t51 following the time t31, and the voltage of the node A gradually decreases. In addition, since the selection transistor Msw and the load transistor Mcc are in a conductive state between the time t41 and the time t51, the source follower 121 causes the current to flow from the second drive power supply line PVDD2 to the reference voltage line PVSS. Consequently, the pixel 502 outputs the output signal OUT(n) corresponding to the voltage supplied to the gate electrode 620 (the first electrode 620) of the driving transistor Msf.

As shown in FIG. 4, the voltage of the node A gradually decreases and becomes a voltage Vn at the time t3. The voltage of the output signal OUT(n) gradually increases from the reference voltage VSS at the time t41. In the time t3, the voltage of the output signal OUT(n) becomes the third voltage V(t3) corresponding to the voltage Vn of the node A. The third voltage V(t3) is supplied to the read-out signal line 420. The read-out circuit 600 reads the third voltage V(t3) supplied to the read-out signal line 420.

Further, the read-out circuit 600 may convert the third voltage V(t3) into a digital signal and transmit the digital signal to the signal processing circuit 700, and the signal processing circuit 700 may receive the digital signal of the third voltage V(t3). As described above, in the driving process of the solid-state imaging device 100 according to the embodiment of the present disclosure, the fourth period T4 is also a period for acquiring the third voltage V(t3).

For example, between the time t3 and the time t51 of the imaging data acquiring period, the signal processing circuit 700 may generate data (V(t2)−V(t3)) obtained by subtracting the third voltage V(t3) from the second voltage V(t2) using the digital signal of the second voltage V(t2) and the digital signal of the third voltage V(t3). The image processing circuit 720 included in the signal processing circuit 700 generates imaging data of a subject using data (V(t2)−V(t3)) obtained by subtracting the third voltage V(t3) from the second voltage V(t2). The third voltage V(t3) is smaller than the second voltage V(t2), and the difference between the second voltage V(t2) and the third voltage V(t3) is the voltage (V(t2)−V(t3)). The imaging data of the subject may be generated in the imaging data acquisition period.

<1-3-4. Blank Period>

In the blank period, for example, the PUF-ID extraction circuit 710 included in the signal processing circuit 700 generates the PUF-ID data unique to the solid-state imaging device 100 using the digital signal corresponding to the feedthrough voltage converted for each row. In the blank period, for example, the image processing circuit 720 included in the signal processing circuit 700 generates imaging data of a subject using a digital signal of data (V(t2)−V(t3)) obtained by subtracting the third voltage V(t3) from the second voltage V(t2) converted for each row. Further, in the blank period, for example, the signal processing circuit 700 combines the PUF-ID data unique to the solid-state imaging device 100 and the imaging data of the subject, and generates imaging data including PUF-ID data capable of suppressing counterfeiting. As shown in FIG. 4, the blank period has a fifth period T5. In the blank period, for example, the pixel 502 is in the same state as the exposure state.

With reference to FIG. 4, driving methods in the fifth period T5 will be described. As shown in FIG. 4, the reset signal RG(n) is maintained at a low level during time t61 from the time t51. At time t51, the selection signal SG(n) changes from a high level to a low level, and the selection signal SG(n) is supplied with the low level. The selection signal SG(n) remains at the low level until the time t61. Although not shown, the bias voltage supply signal VB maintains the bias voltage Vbias from the time t51 to the time t61.

Therefore, during the period from the time t51 to the time t61, the photo diode (PD) continues to receive light as in the exposure period, and the current flows from the node A toward the common electrode 422, and the voltage of the node A gradually decreases. Further, during the period from the time t51 to the time t61, the selection transistor Msw is in the non-conductive state and the load transistor Mcc is in the conductive state, so that the current flows from the read-out signal line 420 toward the reference voltage line PVSS, and the voltage of the output signal OUT(n) becomes the reference voltage VSS.

In the driving process of the solid-state imaging device 100 according to the embodiment of the present disclosure, for example, the coordinates of the pixels 502 are set as input signals (challenges), the data of the feedthrough voltages corresponding to the challenges of the plurality of pixels 502 is extracted, and PUF-ID data (responses) is generated using the data of the plurality of feedthrough voltages. Further, in the driving process of the solid-state imaging device 100 according to the embodiment of the present disclosure, the imaging data of the subject is generated using the data (V(t2)−V(t3)) obtained by subtracting the third voltage V(t3) from the second voltage V(t2). After the PUF-ID data (response) is generated, the imaging data of the subject may be generated, and after the imaging data of the subject is generated, the PUF-ID data (response) may be generated. In the solid-state imaging device 100 according to an embodiment of the present disclosure, the PUF-ID data and the imaging data of the subject are combined to generate imaging data including the PUF-ID data.

By using the driving methods of the solid-state imaging device 100 according to the embodiment of the present disclosure, it is possible to acquire two pieces of data of the unique PUF-ID data based on the feedthrough voltage of the pixel 502 of the solid-state imaging device 100 and the imaging data of the subject captured by the solid-state imaging device 100 in a series of driving operations. Further, by using the driving methods of the solid-state imaging device 100 according to the embodiment of the present disclosure, it is possible to combine the unique PUF-ID data based on the feedthrough voltage and the imaging data of the subject captured by the solid-state imaging device 100. The unique PUF-ID data is ID data unique to the solid-state imaging device 100. Therefore, by using the driving methods of the solid-state imaging device 100 according to an embodiment of the present invention, it is possible to prove that the imaging data is data captured by using the solid-state imaging device 100 by using the PUF-ID data and the imaging data of the subject acquired in a series of driving operations, it is possible to prevent the imitation of the imaging data, and in turn, it is possible to suppress the production of a counterfeit or a pirated copy.

Also, the unique ID generated by the photovoltaic device PD using photovoltaic power or current (light current or dark current) may vary depending on environmental conditions such as light place, dark place, and air temperature, and therefore it is difficult to use it as a unique ID. On the other hand, in the driving method of the solid-state imaging device 100 according to the embodiment of the present disclosure, the pixel 502 does not generate the PUF-ID data using data in the exposure state, that is, the exposure period in which the photo diode (PD) receives light, but the pixel 502 generates the PUF-ID data using the feedthrough voltage in the reset state. Therefore, the solid-state imaging device 100 can generate a PUF-ID in which the effect of light is suppressed. Therefore, by using the driving method of the solid-state imaging device 100 according to an embodiment of the present disclosure, it is difficult to be affected by the environment by using the PUF-ID data and the imaging data of the subject acquired in the series of driving operations, and further, it is possible to prove that the imaging data is data captured by using the solid-state imaging device 100, and it is also possible to prevent the imitation of the imaging data, and thus it is possible to suppress the manufacture of a counterfeit product or a pirated copy.

2. Second Embodiment

<2-1. Configuration of Solid-State Imaging Device 100B>

Figure 9:
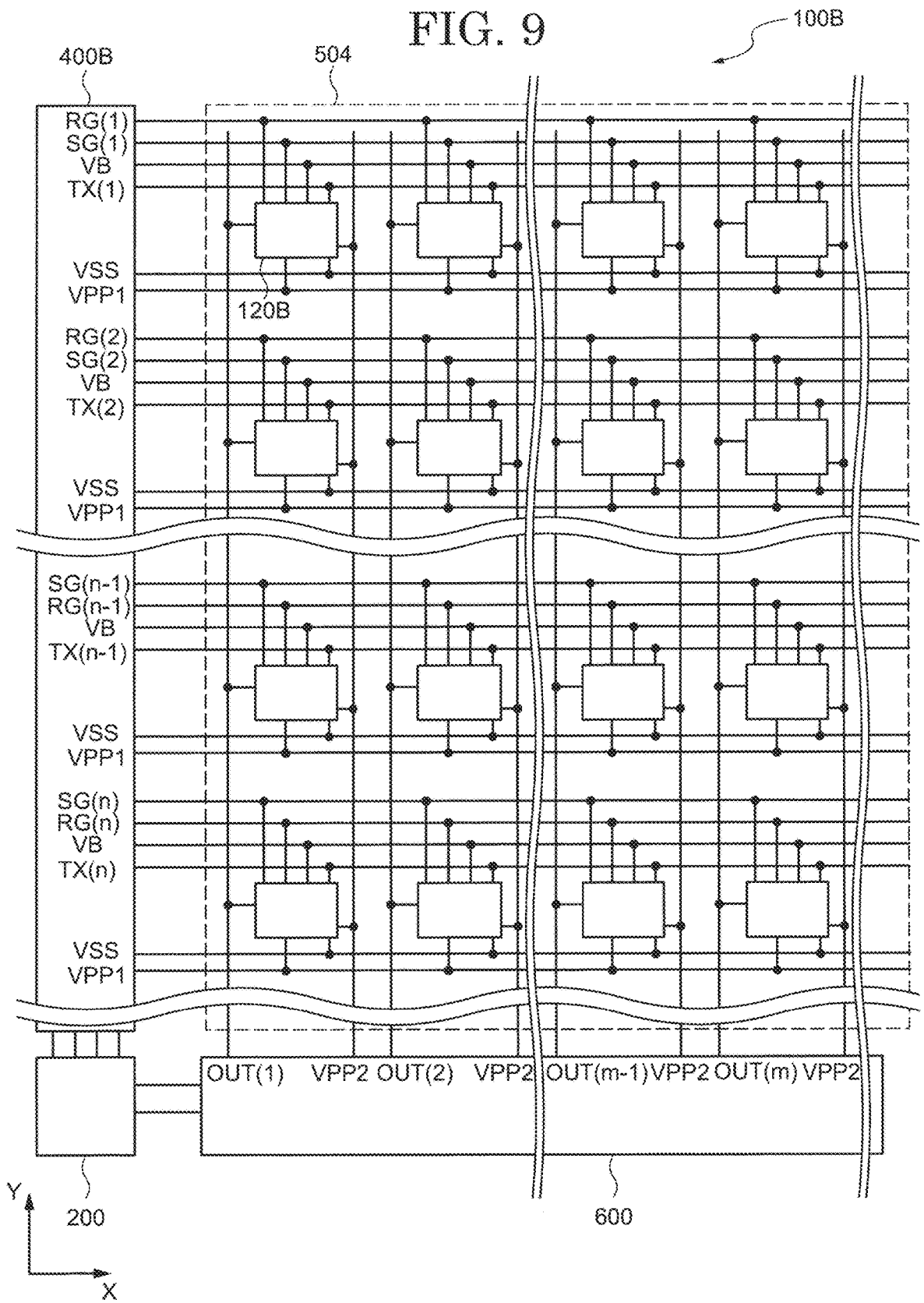
FIG. 9 is a plan view showing a configuration of a detection device according to an embodiment of the present invention.

FIG. 9 is a schematic plan view showing a configuration of a solid-state imaging device 100B according to an embodiment of the present disclosure. The configuration of the solid-state imaging device 100B according to an embodiment of the present disclosure is a configuration in which the transmission signal TX(n) is added to the configuration of the solid-state imaging device 100. Therefore, in the second embodiment, a configuration mainly related to the transmission signal TX(n) will be described. The configuration of the solid-state imaging device 100B according to an embodiment of the present disclosure is not limited to the configuration shown in FIG. 9. Descriptions of the same or similar configurations as those of the first embodiment are omitted here.

As shown in FIG. 9, a row selection circuit 400B supplies the transmission signal TX(n) to the configuration of the row selection circuit 400 and to each of the plurality of pixels 502 (the pixel circuit 120) located in the n-th row in the pixel section 504.

<2-2. Configuration of Pixel 502>

Figure 10:
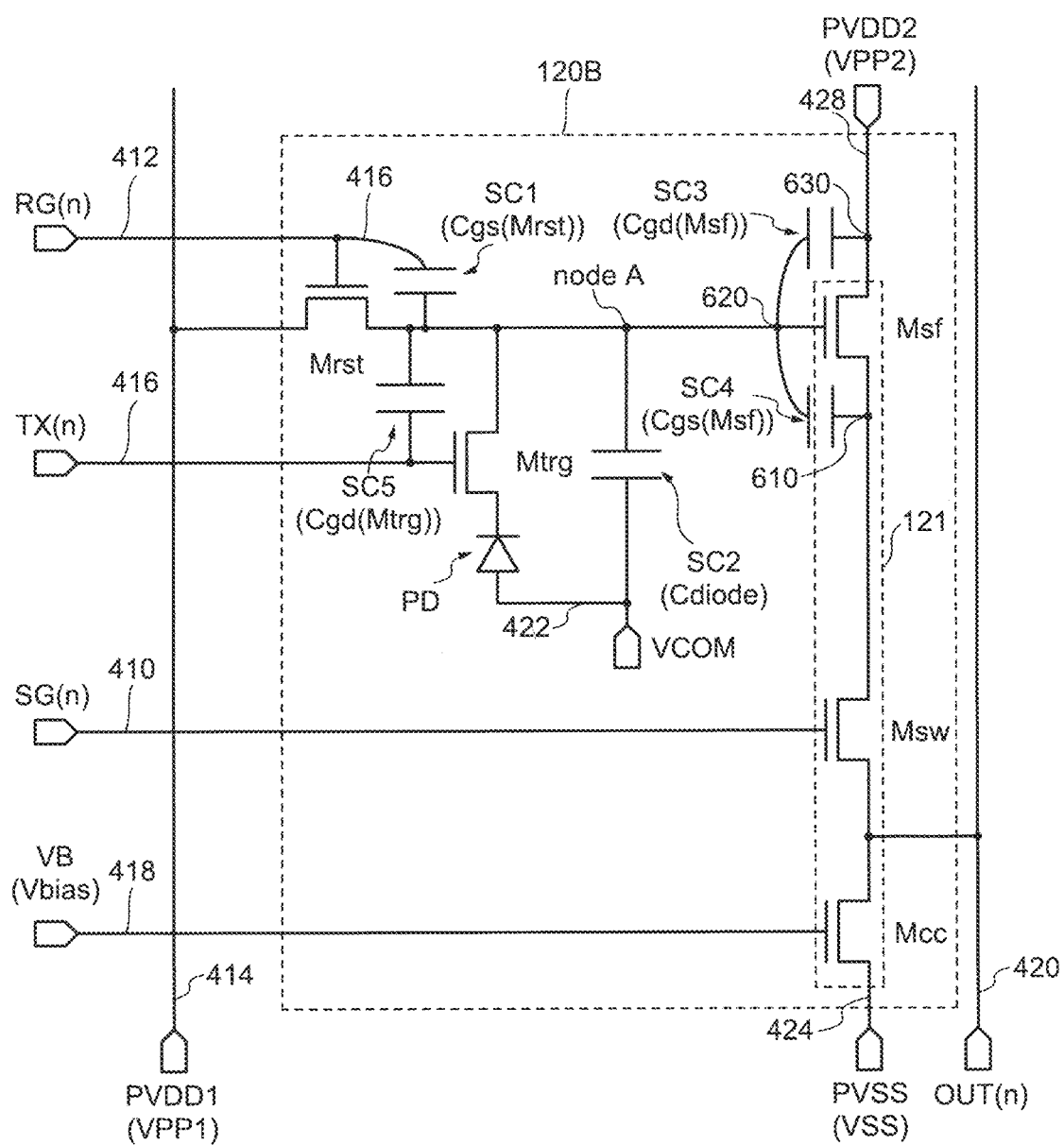
FIG. 10 is a circuit diagram showing a pixel circuit according to an embodiment of the present invention.

FIG. 10 is a circuit diagram showing a pixel circuit 120B according to an embodiment of the present disclosure. Each of the plurality of pixels 502 includes a plurality of transistors constituting the pixel circuit 120B, a capacitor, and a photo diode (PD). FIG. 10 shows components constituting the pixel circuit 120B of the pixel 502 of the n-th row and m-th column shown in FIG. 9. The configuration of the pixel circuit 120B is a configuration in which the transmission signal TX(n), a transfer transistor Mtrg, and a fifth capacitor SC5 are added to the configuration of the solid-state imaging device 100. Therefore, a configuration related to the transmission signal TX(n), the transfer transistor Mtrg, and the fifth capacitor SC5 will be mainly described here. The configuration of the pixel circuit 120B shown in FIG. 10 is an example, and the configuration of the pixel circuit 120B is not limited to the configuration shown in FIG. 10. Descriptions of the same or similar configurations as those of the first embodiment are omitted here.

As shown in FIG. 10, the pixel circuit 120B includes, for example, the transfer transistor Mtrg (the fifth switch) in addition to the configuration of the pixel circuit 120. Similar to the other transistors, the transfer transistor Mtrg (the fifth switch) also includes a pair of electrodes including the gate electrode (the first electrode), a source electrode, and a drain electrode (a pair of electrodes including the second electrode and the third electrode). Depending on the voltage applied to the source electrode and the drain electrode, the function as the source and the function as the drain of each electrode may be interchanged.

The transfer transistor Mtrg selects connection or disconnection between the node A and the first electrode of the photo diode (PD) based on the transmission signal TX(n). Consequently, the transfer transistor Mtrg adjusts the voltage of the node A using the photovoltaic power generated based on the light received by the photo diode (PD) in accordance with the exposure of the pixel 502. In an embodiment of the present disclosure, the photovoltaic power generated based on the light received by the photo diode (PD) may be referred to as a voltage generated by exposure of the photo diode.

The gate electrode (the first electrode) of the transfer transistor Mtrg is electrically connected to a transfer signal line 416. The transmission signal TX(n) is supplied to the transfer signal line 416. The conductive state and the non-conductive state of the transfer transistor Mtrg are controlled by the signal supplied to the transfer signal line 416. When the signal supplied to the transfer signal line 416 is at a high level, the transfer transistor Mtrg becomes conductive. When the signal supplied to the transfer signal line 416 is at a low level, the transfer transistor Mtrg becomes non-conductive. The source electrode (the second electrode) of the transfer transistor Mtrg is electrically connected to the first electrode of the photo diode (PD). The drain electrode (the third electrode) of the transfer transistor Mtrg and the second electrode of the fifth capacitor are connected to the node A. The first electrode of the fifth capacitor is connected to the gate electrode (the first electrode) of the transfer transistor Mtrg. The fifth capacitor SC5 has a pair of electrodes (a first electrode and a second electrode) in the same manner as the first capacitor to the fourth capacitor. The fifth capacitor SC5 is, for example, a parasitic capacitance and an additional capacitance between the node A and the gate electrode (the first electrode) of the transfer transistor Mtrg, and the capacitance value of the fifth capacitor SC5 is a capacitance value Cgd (Mtrg). The fifth capacitor SC5 may hold a charge corresponding to the first drive voltage VPP1 supplied to the node A, or may hold a charge corresponding to the photovoltaic power generated based on the light received by the photo diode (PD).

<2-3. Driving Method of Solid-State Imaging Device 100B>

Figure 11:
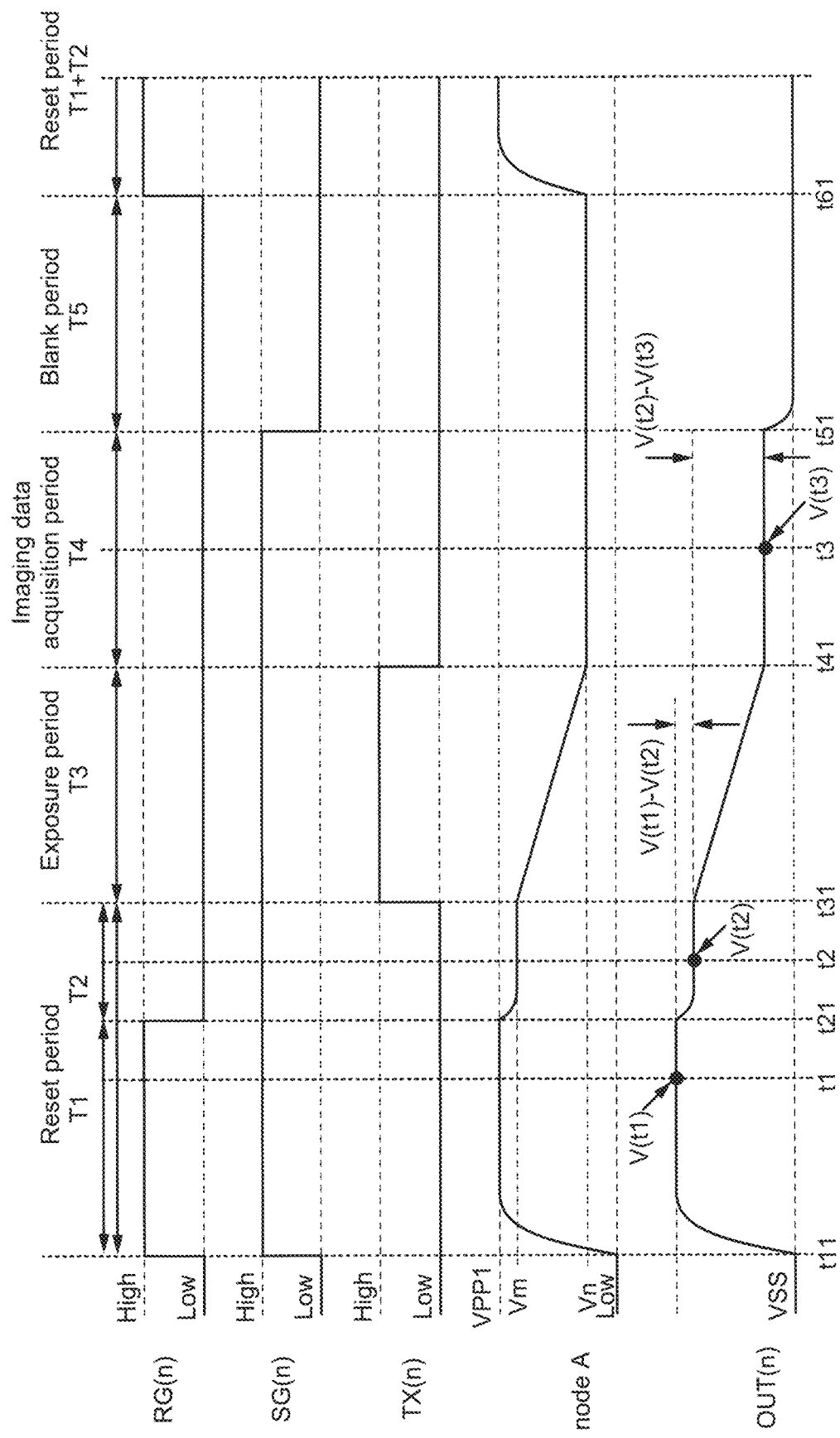
FIG. 11 is a timing chart showing a driving method of a detection device according to an embodiment of the present invention.

FIG. 11 is a schematic diagram showing a timing chart of the solid-state imaging device 100B according to an embodiment of the present disclosure. FIG. 12 to FIG. 15 are schematic diagrams showing the operation states of the pixels 502 at the timings shown in FIG. 11. The driving method shown in FIG. 11 to FIG. 15 is an exemplary driving method of the solid-state imaging device 100B according to an embodiment of the present invention, and the driving method of the solid-state imaging device 100B is not limited to the driving method shown in FIG. 11 to FIG. 15. Descriptions of the same or similar configurations as those of the first embodiment and FIG. 10 will be omitted.

<2-3-1. Reset Period>

Figure 12:
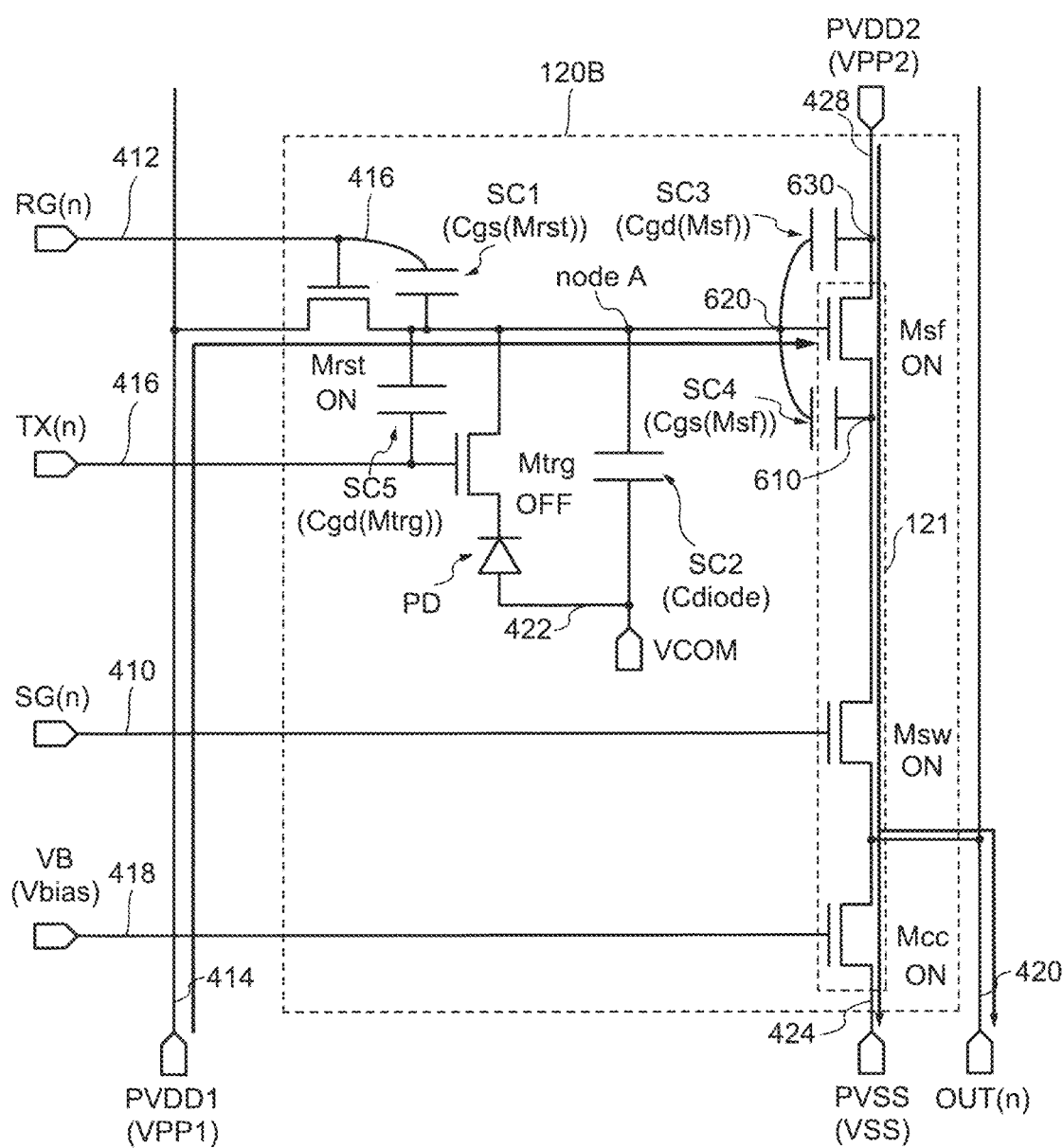
FIG. 12 is a schematic view showing an operation state of a pixel at the timing shown in FIG. 11.
Figure 13:
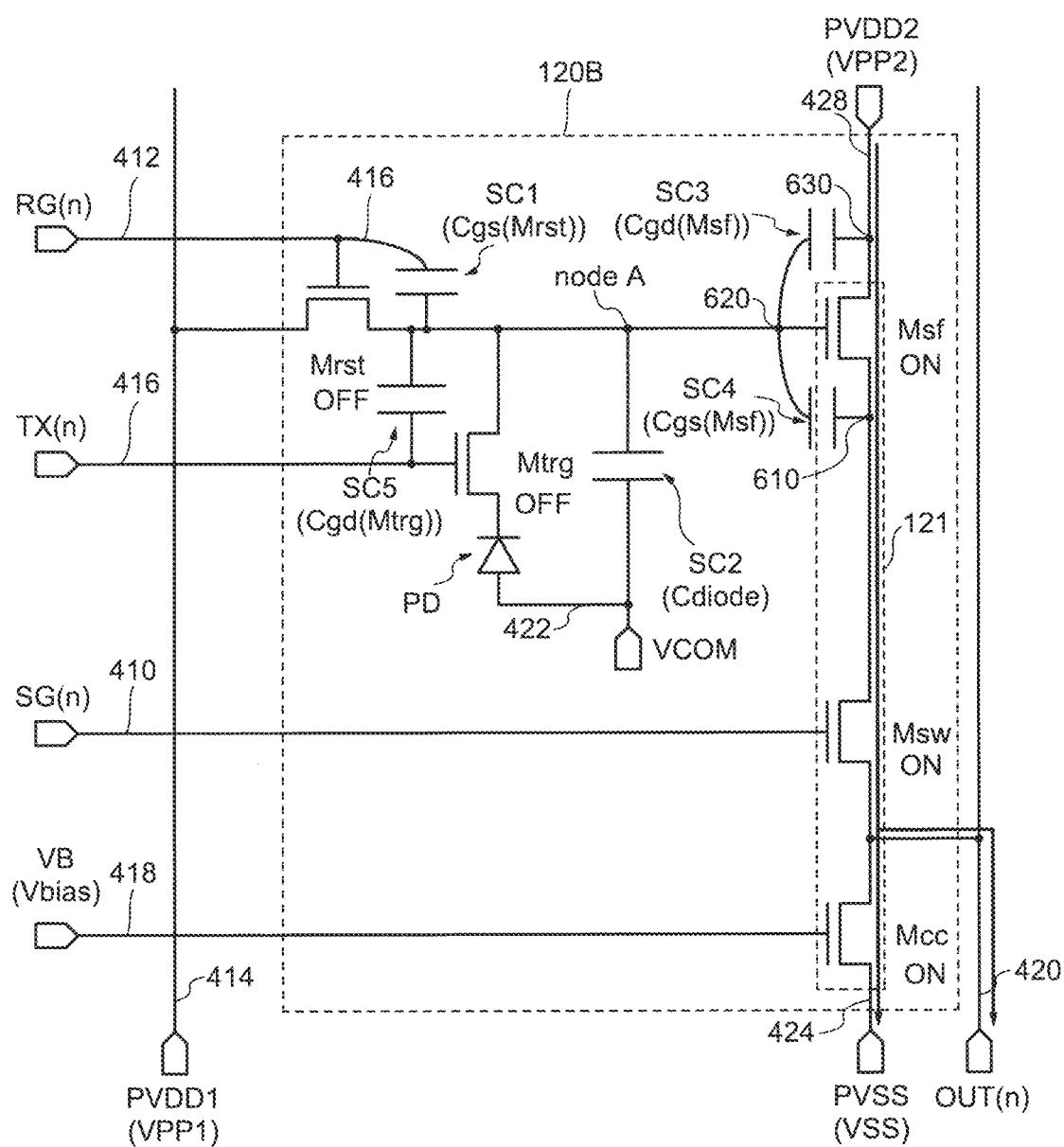
FIG. 13 is a schematic view showing an operation state of a pixel at the timing shown in FIG. 11.

As shown in FIG. 11 to FIG. 13, the transmission signal TX(n) is supplied at a low level during the reset period. Therefore, as shown in FIG. 12 and FIG. 13, the transfer transistor Mtrg is not conductive. In the reset period, the description other than the description related to the transmission signal TX(n) and the transfer transistor Mtrg is the same as the description of the first embodiment, and therefore, the description thereof is omitted here.

In the solid-state imaging device 100B according to the second embodiment, the feedthrough voltage (voltage V(t1)–V(t2)) is expressed by Equation (2) shown below. In Equation (2), ΔVg is the change in voltage of the gate electrode of the reset transistor Mrst, and CallnodeA is the sum of the capacitance added to the node A. The summation of the volume added to the node A includes the capacitance value Cgs (Mrst), the capacitance value Cdiode, the capacitance value Cgd (Msf), the capacitance value Cgs (Msf), the capacitance value Cgd (Mtrg), the capacitance value to the volume between the node A of the transfer transistor Mtrg and the first electrode side of the photo diode (PD) (the figure is omitted), other additional capacitance values and a parasitic capacitance value.

$$V(t1) - V(t2) = \Delta Vg \times \frac{Cgs(Mrst)}{CallnodeA} \quad (2)$$

<2-3-2. Exposure Period>

As in the first embodiment, also in the second embodiment, the exposure period is a period during which the pixel 502 is brought into the exposure state. That is, the exposure period is a period in which the solid-state imaging device 100B adjusts the current flowing through the source follower 121 using the photovoltaic power generated based on the light received by the photo diode (PD) in accordance with the exposure of the pixel 502. As shown in FIG. 11, the exposure period has the third period T3.

Figure 14:
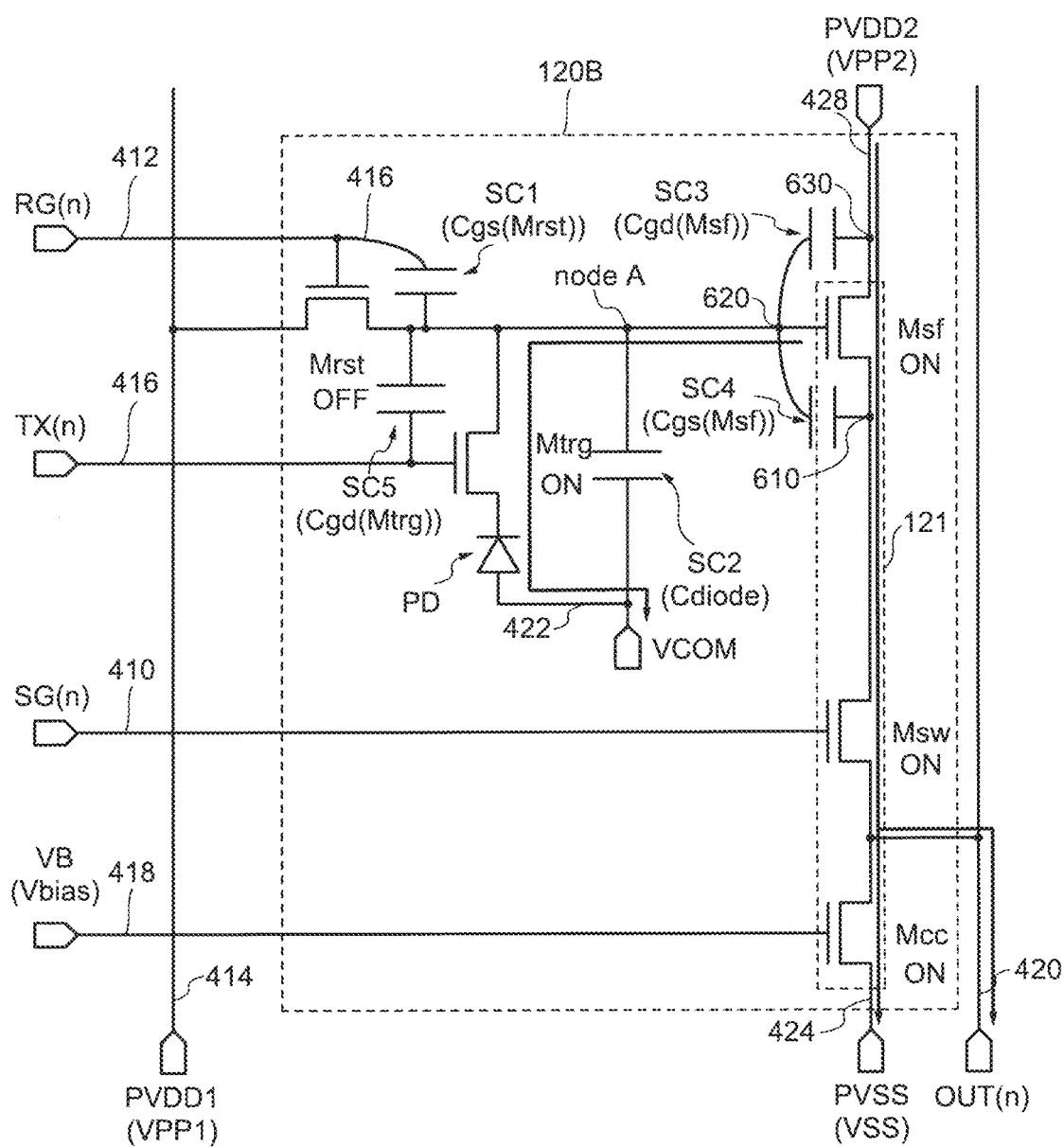
FIG. 14 is a schematic view showing an operation state of a pixel at the timing shown in FIG. 11.

With reference to FIG. 11 and FIG. 14, the driving method in the third period T3 will be described. As shown in FIG. 11, the reset signal RG(n) is maintained at a low level and the selection signal SG(n) is maintained at a high level from the time t31 to the time t41. At the time t31, the transmission signal TX(n) changes from a low level to a high level, and the transmission signal TX(n) is supplied with the high level. The transmission signal TX(n) remains at the high level until the time t41. Although not shown, the bias voltage supply signal VB maintains the bias voltage Vbias from the time t31 to the time t41.

Therefore, as shown in FIG. 14, the reset transistor Mrst is in a non-conductive state and the selection transistor Msw, the transfer transistor Mtrg, and the load transistor Mcc are in a conductive state from the time t31 to the time t41.

Upon exposure of the pixel 502, the photo diode (PD) generates photovoltaic power based on the received light. Consequently, during the time t31 to the time t41, the current flows from the node A toward the common electrode 422, and the voltage of the node A gradually decreases from the voltage Vm at the time t31 to the voltage Vn at the time t41. That is, the transfer transistor Mtrg supplies the voltage generated by the exposure of the photo diode (PD) to the node A (the gate electrode 620 of the driving transistor Msf). In addition, since the selection transistor Msw and the load transistor Mcc are in a conduction state between the time t31 and the time t41, the source follower 121 causes the current to flow from the second drive power supply line PVDD2 to the reference voltage line PVSS. Consequently, the pixel 502 outputs the output signal OUT(n) corresponding to the voltage supplied to the gate electrode 620 (the first electrode 620) of the driving transistor Msf.

As shown in FIG. 11, the voltage of the output signal OUT(n) becomes the third voltage V(t3) corresponding to the voltage Vn of the node A at the time t41 from the second voltage V(t2) at the time t31 to follow the reduction in the voltage of the node A. The third voltage V(t3) is supplied to the read-out signal line 420. That is, the voltage of the output signal OUT(n) becomes the third voltage V(t3) corresponding to the voltage Vn of the node A.

<2-3-3. Imaging Data Acquisition Period>

As in the first embodiment, also in the second embodiment, the imaging data acquisition period is a period in which the pixel 502 is placed in a state in which the imaging data of a subject can be acquired and imaging data of a subject is acquired. The second voltage V(t2) and the third voltage V(t3) are used to generate the imaging data. As shown in FIG. 11, the imaging data acquiring period has the fourth period T4.

Figure 15:
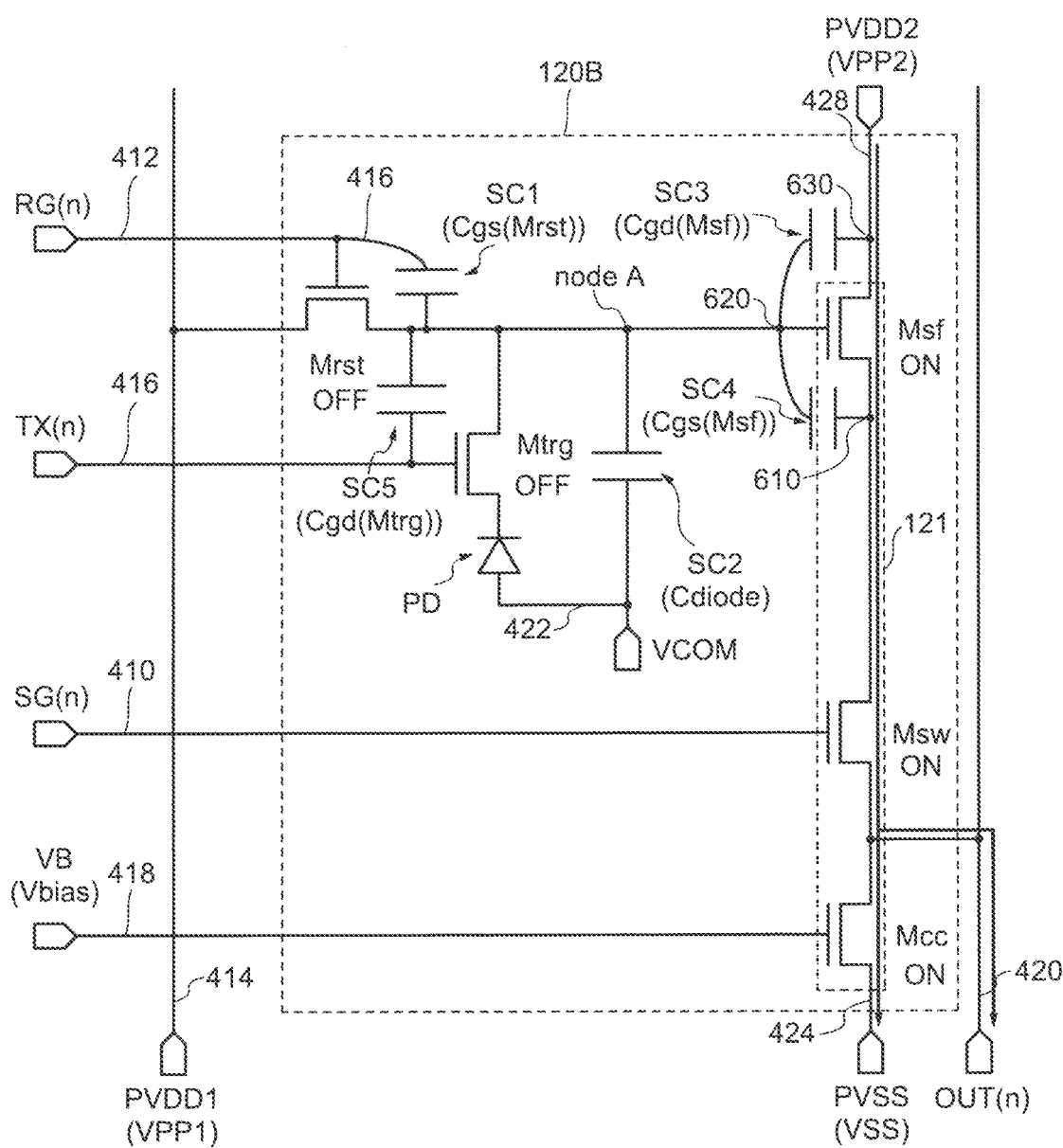
FIG. 15 is a schematic view showing the operation status of the pixel at the timing shown in FIG. 11.

With reference to FIG. 11 and FIG. 15, driving methods in the fourth period T4 will be described. As shown in FIG. 11, the reset signal RG(n) is maintained at a low level and the selection signal SG(n) is maintained at a high level from the time t41 to the time t51. Further, at time t41, the transmission signal TX(n) changes from a high level to a low level, and the transmission signal TX(n) is supplied with the low level. The transmission signal TX(n) remains at the low level until the time t41. Although not shown, the bias voltage supply signal VB maintains the bias voltage Vbias from the time t41 to the time t51.

Therefore, as shown in FIG. 15, during the period from the time t41 to the time t51, the reset transistor Mrst and the transfer transistor Mtrg are in the non-conductive state, and the selection transistor Msw and the load transistor Mcc are in the conductive state.

During time t41 to time t51, no current flows from the node A toward the common electrode 422, so that the voltage at the node A maintains the voltage Vn. In addition, since the selection transistor Msw and the load transistor Mcc are conductive during the time t41 to the time t51, the source follower 121 continues to flow the current from the second drive power supply line PVDD2 to the reference voltage line PVSS. Consequently, the pixel 502 maintains the output signal OUT(n), that is, the third voltage V(t3), corresponding to the voltage (the voltage Vn of the node A) supplied to the gate electrode 620 (the first electrode 620) of the driving transistor Msf.

As in the first embodiment, also in the second embodiment, the read-out circuit 600 reads out the third voltage V(t3) supplied to the read-out signal line 420. Further, the read-out circuit 600 may convert the third voltage V(t3) into a digital signal and transmit the digital signal to the signal processing circuit 700, and the signal processing circuit 700 may receive the digital signal of the third voltage V(t3). As described above, in the driving method of the solid-state imaging device 100 according to the embodiment of the present disclosure, the fourth period T4 is also a period for acquiring the third voltage V(t3).

Similar to the first embodiment, in the second embodiment, for example, between the time t3 and the time t51 of the imaging data acquiring period, the signal processing circuit 700 may generate data (V(t2)–V(t3)) obtained by subtracting the third voltage V(t3) from the second voltage V(t2) using the digital signal of the second voltage V(t2) and the digital signal of the third voltage V(t3). The image processing circuit 720 included in the signal processing circuit 700 generates the imaging data of a subject using the data (V(t2)–V(t3)) obtained by subtracting the third voltage V(t3) from the second voltage V(t2).

<2-3-4. Blank Period>

As in the first embodiment, also in the second embodiment, in the blank period, for example, the PUF-ID extraction circuit 710 included in the signal processing circuit 700 generates the PUF-ID data unique to the solid-state imaging device 100 by using the digital signal corresponding to the feedthrough voltage converted for each row. In the blank period, for example, the image processing circuit 720 included in the signal processing circuit 700 generates imaging data of a subject using the digital signal of data (V(t2)–V(t3)) obtained by subtracting the third voltage V(t3) from the second voltage V(t2) converted for each row. Further, in the blank period, for example, the signal processing circuit 700 combines the PUF-ID data unique to the solid-state imaging device 100 and the imaging data of the subject, and generates imaging data including the PUF-ID data capable of suppressing counterfeiting. As shown in FIG. 11, the blank period has the fifth period T5.

The driving methods in the fifth period T5 will be described with reference to FIG. 11. As shown in FIG. 11, the resetting signal RG(n) and the transmission signal TX(n) remain at a low level during the time t51 and the time t61. At time t51, the selection signal SG(n) changes from a high level to a low level, and the selection signal SG(n) is supplied with the low level. The selection signal SG(n) remains at the low level until the time t61. Although not shown, the bias voltage supply signal VB maintains the bias voltage Vbias from the time t51 to the time t61.

Therefore, since the current does not flow from the node A toward the common electrode 422 even during the period from the time t51 to the time t61, the voltage of the node A maintains the voltage Vn. Further, during the period from the time t51 to the time t61, the selection transistor Msw is in the non-conductive state and the load transistor Mcc is in the conductive state, so that the current flows from the read-out signal line 420 toward the reference voltage line PVSS, and the voltage of the output signal OUT(n) becomes the reference voltage VSS.

Also in the driving method of the solid-state imaging device 100B according to the embodiment of the present disclosure, similar to the driving method of the solid-state imaging device 100, the solid-state imaging device 100B can extract the data of the feedthrough voltage corresponding to the challenge of the plurality of pixels 502, and can generate the PUF-ID data (response) using the data of the plurality of feedthrough voltages, and can generate the imaging data of the subject using the data (V(t2)–V(t3)) obtained by subtracting the third voltage V(t3) from the second voltage V(t2). Consequently, in the method of driving the solid-state imaging device 100B according to the embodiment of the present disclosure, as in the method of driving the solid-state imaging device 100, the PUF-ID data and the imaging data of the subject can be combined to generate the imaging data including the PUF-ID data.

The driving method of the solid-state imaging device 100B according to the embodiment of the present invention can obtain the same advantageous effects as the driving method of the solid-state imaging device 100 according to the embodiment of the present invention.

3. Third Embodiment

Figure 16:
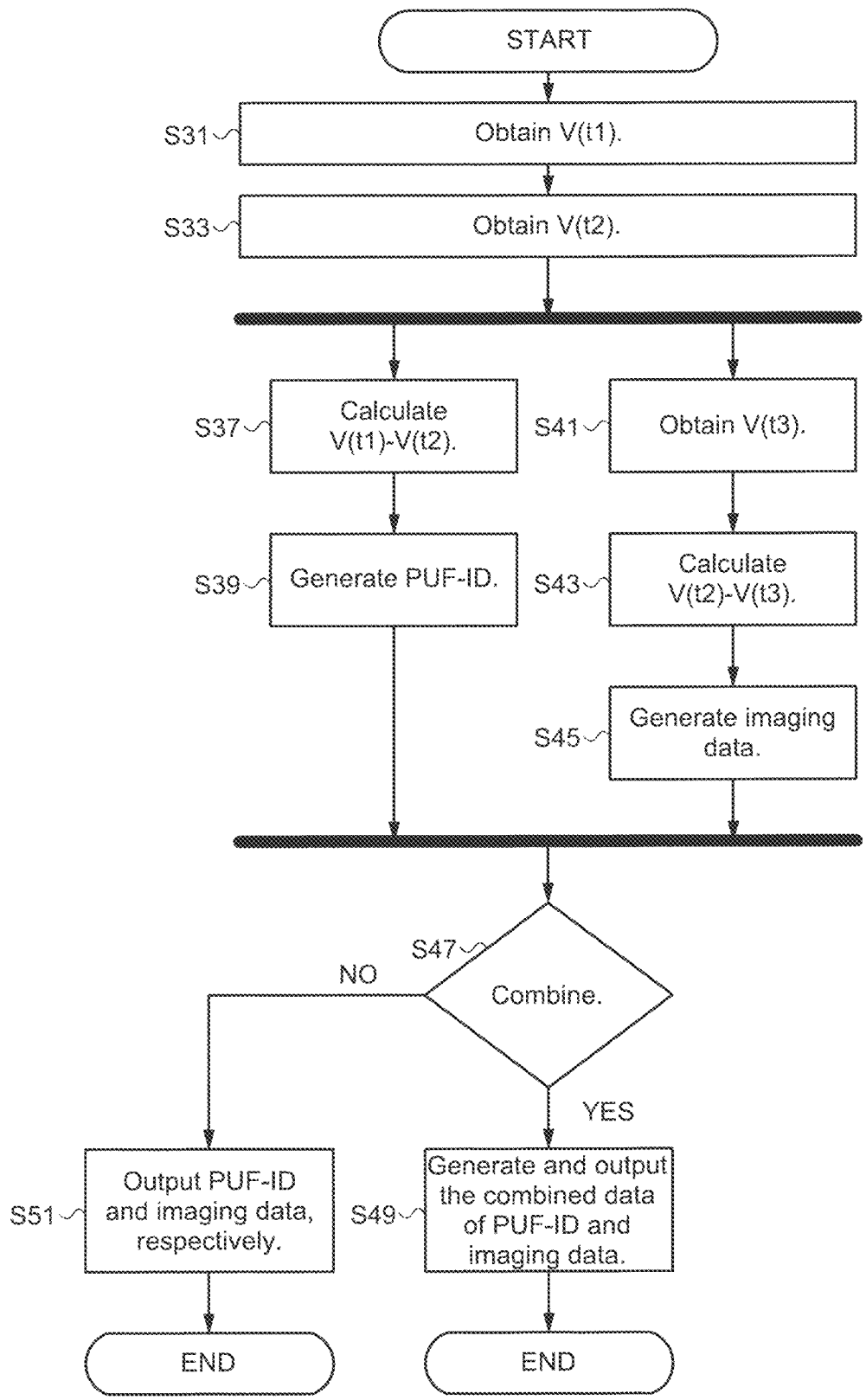
FIG. 16 is a flowchart showing a driving method using a detection device according to an embodiment of the present invention.

FIG. 16 is a flow chart showing a driving method of the solid-state imaging device 100 or 100B according to an embodiment of the present disclosure. The driving method of the solid-state imaging device 100 or 100B according to the embodiment is not limited to the flow chart shown in FIG. 16. Descriptions of the same or similar configurations as those of the first embodiment or the second embodiment are omitted here.

As shown in FIG. 16, for example, the user starts imaging using the solid-state imaging device 100 or 100B. The drive timing control circuit 300 transmits the challenge to the row selection circuit 400, the read-out circuit 600, and the signal processing circuit 700.

When each of the plurality of pixels 502 receives the challenge and the respective signal, in a step S31, each of the plurality of pixels 502 acquires the first voltage V(t1). In other words, the first voltage V(t1) is supplied to the output-signal OUT. Each of the plurality of pixels 502 performs the step S31 in the first period T1. Further, for example, the read-out circuit 600 receives the first voltage V(t1), converts the first voltage V(t1) into a digital signal for each row, and transmits a plurality of first voltages V(t1) converted into digital signals to the signal processing circuit 700 for each row. The signal processing circuit 700 stores the plurality of first voltages V(t1) converted into digital signals in, for example, a memory circuit.

Subsequently, in a step S33, each of the plurality of pixels 502 acquires the second voltage V(t2). In other words, the second voltage V(t2) is supplied to the output-signal OUT. Each of the plurality of pixels 502 performs the step S33 in the second period T2. Further, for example, the read-out circuit 600 receives the second voltage V(t2), converts the second voltage V into a digital signal for each row, and transmits a plurality of second voltages V(t2) converted into digital signals to the signal processing circuit 700 for each row. The signal processing circuit 700 stores the plurality of second voltages V(t2) converted into digital signals in, for example, a memory circuit.

Subsequently, the solid-state imaging device 100 or the solid-state imaging device 100B executes processes between the step S33 and a step S47 in parallel. That is, the solid-state imaging device 100 or the solid-state imaging device 100B executes the processing after a step S37 and the processing after a step S41 in parallel. In the step S37, the signal processing circuit 700 calculates a feedthrough voltage obtained by subtracting the second voltage V(t2) from the first voltage V(t1). In the step S41, each of the plurality of pixels 502 obtains the third voltage V(t3). The solid-state imaging device 100 or 100B executes the step S37 and the step S41 in, for example, the fourth period T4.

In the step S37, the signal processing circuit 700 reads out the plurality of first voltages V(t1) and the plurality of second voltages V(t2) stored in the storage circuit. Further, the signal processing circuit 700 calculates a plurality of feedthrough voltages obtained by subtracting the second voltage V(t2) from the first voltage V(t1) using the plurality of first voltages V(t1) and the plurality of second voltages V(t2). The first voltage V(t1), the second voltage V(t2), and the feedthrough voltage are digital signals.

Next, in a step S39, the signal processing circuit 700 transmits a plurality of feedthrough voltages to the PUF-ID extraction circuit 710, and the PUF-ID extraction circuit 710 uses the plurality of feedthrough voltages to generate the PUF-ID data unique to the solid-state imaging device 100 or 100B.

In the step S41, each of the plurality of pixels 502 obtains the third voltage V(t3). That is, each of the plurality of pixels 502 supplies the third voltage V(t3) to the output-signal OUT. Further, for example, the read-out circuit 600 receives the third voltage V(t3) from each of the plurality of pixels 502, converts the third voltage V(t3) into the digital signal for each row, and transmits a plurality of third voltages V(t3) converted into the digital signal to the signal processing circuit 700 for each row. The signal processing circuit 700 stores the plurality of third voltages V(t3) converted into digital signals in, for example, a memory circuit.

In a step S43, the signal processing circuit 700 reads out the plurality of second voltages V(t2) and the plurality of third voltages V(t3) stored in the storage circuit. In addition, the signal processing circuit 700 generates the plurality of data obtained by subtracting the third voltage V(t3) from the second voltage V(t2) by using the plurality of second voltages V(t2) and the plurality of third voltages V(t3). The third voltage V(t3) is a digital signal.

Next, in a step S45, the signal processing circuit 700 transmits the plurality of data obtained by subtracting the third voltage V(t3) from the generated second voltage V(t2) to the image processing circuit 720. The image processor 720 generates imaging data using the plurality of data obtained by subtracting the third voltage V(t3) from the second voltage V(t2).

Note that, the step S45 may be executed after the step S39, and the step 39 may be executed after the step 45.

Next, in the step S47, the image processing circuit 720 selects whether to combine the generated PUF-ID data and the generated imaging data. The solid-state imaging device 100 or 100B may execute the step S47, for example, in the fourth period T4 or in the fifth period T5.

When the image processing circuit 720 selects combining the generated PUF-ID data unique to the solid-state imaging device 100 or 100B and the generated imaging data (YES), the image processing circuit 720 combines the generated PUF-ID data and the generated imaging data unique to the generated solid-state imaging device 100 or 100B in a step S49, and generates imaging data including the PUF-ID data capable of suppressing counterfeiting. In addition, the image processing circuit 720 transmits the captured imaging data including the generated PUF-ID data capable of suppressing counterfeiting to, for example, a host (not shown) or a display device (not shown). The operation of the solid-state imaging device 100 or 100B according to an embodiment of the present disclosure is completed.

When the image processing circuit 720 selects not to combine the generated PUF-ID data unique to the generated solid-state imaging device 100 or the solid-state imaging device 100B and the generated imaging data (NO), the image processing circuit 720 outputs the generated PUF-ID data unique to the generated solid-state imaging device 100 or 100B and the generated imaging data, respectively, in a step S51. The image processing circuit 720 may output the generated PUF-ID data unique to the solid-state imaging device 100 or the solid-state imaging device 100B, and then output the generated imaging data, and may output the generated imaging data, and then output the generated PUF-ID data unique to the solid-state imaging device 100 or the solid-state imaging device 100B. The image processing circuit 720 transmits the generated PUF-ID data unique to the the solid-state imaging device 100 or the solid-state imaging device 100B and the generated imaging data to, for example, a host (not shown). The operation of the solid-state imaging device 100 or the solid-state imaging device 100B according to the embodiment is completed.

For example, a host stores the imaging data including the generated PUF-ID data capable of suppressing counterfeiting, the generated PUF-ID data unique to the solid-state imaging device 100 or the solid-state imaging device 100B, or the generated imaging data in the data storage. Further, for example, the display device displays the imaging data including the PUF-ID data capable of suppressing the generated forgery.

As described above, by using the driving method of the solid-state imaging device 100 according to an embodiment of the present disclosure, it is possible to prove that the imaging data is data captured by the solid-state imaging device 100 by using the PUF-ID data and the imaging data of the object acquired in the series of driving operations, and it is possible to prevent the imitation of the imaging data, and in turn, to suppress the production of a counterfeit product or a pirated copy.

The solid-state imaging device 100 may be electrically connected to a host (not shown). For example, the solid-state imaging device 100 may be connected to the host by two-way communication via a wireless network. The host is, for example, a computer that provides an application or a program to the solid-state imaging device 100 via the wireless network. For example, in the case where the solid-state imaging device 100 requests the host to provide an application, the host provides an installation file of the application to the solid-state imaging device 100. The user can install an application in the solid-state imaging device 100 and use the application installed in the solid-state imaging device 100. For example, when there is a demand from the user or the solid-state imaging device 100 regarding the provision of an application or a program related to the acquisition of the imaging data of the object or the acquisition of the PUF-ID, the host provides the installation file or the program of the application to the solid-state imaging device 100. Thus, the user installs the application in the solid-state imaging device 100, and by using the application installed in the solid-state imaging device 100 using the driving methods of the solid-state imaging device 100 in the series of driving operations of the solid-state imaging device 100, it is possible to execute the program of generating and outputting the PUF-ID data and generating and outputting the imaging data of the object using the feed-through voltage unique to the solid-state imaging device 10.

As the embodiment of the present invention, each of the above-described embodiments or a part of each of the above-described embodiments can be appropriately combined as long as they do not conflict with each other.

It is to be understood that the present invention provides other functional effects that are different from the operational effects provided by the aspects of the above-described embodiments, and other functional effects that are obvious from the description of the present specification or other functional effects that can be easily predicted by a person skilled in the art.

What is claimed is:

1. A detection device comprising:
   at least one pixel including a first electrode of a photo diode connected to a gate electrode of a first transistor connected between a power supply line and a read-out signal line; and
   a control circuit configured to control an operation of the at least one pixel in each of a reset period for resetting the gate electrode of the first transistor, an exposure period for exposing the photo diode, and a read-out period to read out a voltage associated with the exposure of the photo diode,
   wherein, the control circuit is configured to:
      read out a first voltage from the read-out signal line during a first period of supplying a reset voltage to the gate electrode of the first transistor;
      read out a second voltage from the read-out signal line during a second period after stopping a supply of the reset voltage to the gate electrode of the first transistor;
      read out a third voltage from the read-out signal line in a fourth period being the read-out period after a third period being the exposure period;
      output a difference value between the first voltage and the second voltage as PUF-ID data; and
      output a difference value between the third voltage and the second voltage as detection data, in the reset period.

2. The detection device according to claim 1, further comprising a plurality of pixels including the at least one pixel,
   wherein, each of the plurality of pixels is configured to execute the reading of the first voltage, the second voltage, and the third voltage.

3. The detection device according to claim 1, further comprising a second transistor connected between a reset voltage line and the gate electrode of the first transistor,
   wherein, the control circuit is configured to control:
      turning on the second transistor; and
      supplying the reset voltage from the reset voltage line to the gate electrode of the first transistor.

4. The detection device according to claim 3, further comprising a third transistor connected between an electrode not connected to a power supply line among a pair of electrodes, and a read-out signal line,
   wherein, the control circuit is configured to control:
      turning on the third transistor; and
      reading the first voltage, the second voltage, and the third voltage.

5. The detection device according to claim 4, further comprising a fourth transistor connected between the read-out signal line and a reference potential line,
  wherein, the control circuit is configured to control:
    supplying a bias voltage to a gate electrode of the fourth transistor;
    turning on the fourth transistor; and
    passing a constant current between a pair of electrodes of the fourth transistor.
6. The detection device according to claim 5, wherein
  the first transistor, the third transistor, and the fourth transistor constitute a source follower, and
  the control circuit is configured to control:
    turning on the first transistor, the third transistor, and the fourth transistor; and
    passing a current between the power supply line and the read-out signal line.
7. The detection device according to claim 6, further comprising a fifth transistor connected between the gate electrode of the first transistor and the first electrode of the photo diode;
  wherein, the control circuit is configured to control:
    turning on the fifth transistor; and
    supplying a voltage generated by the exposure of the photo diode to the gate electrode of the first transistor, in the third period.
8. The detection device according to claim 1, wherein a difference value between the first voltage and the second voltage is a feed through voltage.
9. The detection device according to claim 1, wherein the control circuit is configured to control generating the detection data after generating the PUF-ID data.
10. The detection device according to claim 1, wherein the second voltage is lower than the first voltage, and the third voltage is lower than the second voltage.

* * * * *